US010129018B2

(12) United States Patent
Satpathy et al.

(10) Patent No.: US 10,129,018 B2
(45) Date of Patent: Nov. 13, 2018

(54) HYBRID SM3 AND SHA ACCELERATION PROCESSORS

(71) Applicant: Intel Corporation, Santa Clara, CA (US)

(72) Inventors: Sudhir K. Satpathy, Hillsboro, OR (US); Vikram B. Suresh, Hillsboro, OR (US); Sanu K. Mathew, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 372 days.

(21) Appl. No.: 14/939,141

(22) Filed: Nov. 12, 2015

(65) Prior Publication Data

US 2017/0141914 A1    May 18, 2017

(51) Int. Cl.
| | | |
|---|---|---|
| *G06F 21/72* | (2013.01) | |
| *H04L 9/06* | (2006.01) | |
| *G06F 21/60* | (2013.01) | |
| *G06F 9/30* | (2018.01) | |
| *G06F 9/38* | (2018.01) | |

(52) U.S. Cl.
CPC ........ *H04L 9/0618* (2013.01); *G06F 9/30007* (2013.01); *G06F 9/3877* (2013.01); *G06F 21/602* (2013.01); *G06F 21/72* (2013.01); *H04L 9/0625* (2013.01); *H04L 9/0643* (2013.01); *H04L 2209/12* (2013.01); *H04L 2209/125* (2013.01); *H04L 2209/34* (2013.01)

(58) Field of Classification Search
CPC . H04L 9/0618; H04L 9/0643; H04L 2209/34; G06F 21/602
See application file for complete search history.

(56) References Cited

U.S. PATENT DOCUMENTS

| | | | | |
|---|---|---|---|---|
| 7,142,669 B2* | 11/2006 | Dworkin | ............... | H04L 9/0643 380/28 |
| 7,181,009 B1 | 2/2007 | Huxel | | |
| 7,400,722 B2* | 7/2008 | Qi | ......................... | H04L 9/0643 380/28 |

(Continued)

FOREIGN PATENT DOCUMENTS

CN    102868531    1/2013

OTHER PUBLICATIONS

Jiewen Yao, et al., "White Paper: A Tour Beyond BIOS with the UEFI TPM2 Support in EDKII", Intel, Sep. 2014 (https://firmware.intel.com/sites/defualt/files/resources/A_Tour_Beyond_BIOS_Implementing_TPM2_Support_in_EDKII.pdf) see p. 7, lines 1-7; and figure 1.

(Continued)

*Primary Examiner* — Linglan E Edwards
(74) *Attorney, Agent, or Firm* — Lowenstein Sandler LLP

(57) ABSTRACT

A processing system includes a memory and a processing logic operatively coupled to the memory. The processing logic includes a message scheduling module selectively operating in one of a SHA mode or an SM3 mode to generate a sequence of message words based on an incoming message. The processing logic also includes a round computation module selectively operating in one of the SHA mode or the SM3 mode to perform at least one of a message expansion or a message compression based on at least one message word of the sequence of message words.

20 Claims, 15 Drawing Sheets

(56) References Cited

U.S. PATENT DOCUMENTS

| | | | |
|---|---|---|---|
| 7,970,128 B2* | 6/2011 | Torla | H04L 9/14 |
| | | | 380/28 |
| 9,164,725 B2* | 10/2015 | Boersma | G06F 7/00 |
| 9,177,176 B2* | 11/2015 | Chen | G06F 21/10 |
| 2002/0066014 A1* | 5/2002 | Dworkin | H04L 9/0643 |
| | | | 713/168 |
| 2002/0184498 A1* | 12/2002 | Qi | H04L 9/0643 |
| | | | 713/168 |
| 2008/0052488 A1 | 2/2008 | Fritz et al. | |
| 2008/0229215 A1 | 9/2008 | Baron et al. | |
| 2009/0022307 A1 | 1/2009 | Torla | |

OTHER PUBLICATIONS

International Search Report and Written Opinion for PCT/US2016/055002 dated Jan. 5, 2017, 14 pages.

* cited by examiner

Fig. 4A                    Fig. 4B

HYBRID SM3 AND SHA ACCELERATION PROCESSORS

TECHNICAL FIELD

The embodiments of the disclosure relate generally to a computing device, and, more specifically, relate to a hybrid SM3 and SHA acceleration processors integrating round computation and message scheduling in the processors for providing area optimal configuration in processors as well as accelerating field programmable gate array platforms.

BACKGROUND

Cryptography is a technology often used to protect confidential or secret information in computer systems and other electronic devices. In cryptography, hash algorithms are widely used for data integrity and authenticity. A secure hash (SHA) algorithm is a cryptographic hash function designed by the United States National Security Agency and is a NIST SHA Cipher standard used in multiple cryptographic applications. SHA produces a specific bits hash value (a.k.a. message digest) for any given message. SM3 algorithm is an equivalent Chinese standard for NIST SHA hashing algorithm.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Secure hash algorithm (SHA) is a block cipher cryptographic algorithm that is employed for data encryption/decryption in wireless networks. SM3 is a Chinese equivalent of the SHA.

Conventional hardware accelerators implement separate stand-alone functional unit blocks (FUBs) to accelerate different cryptographic hash algorithms. Separate implementations of the SM3 and the SHA acceleration processors would span a huge number of gates (for example approximately 14.5K gates), which takes up a lot of area on the hardware with a very high logic overhead.

Aspects of the present disclosure eliminate the need for separate implementations of the SM3 and the SHA acceleration processors. Aspects of the present disclosure integrate some of the FUBs of the SM3 and the SHA acceleration processors to provide a hybrid SM3 and SHA processor, thus reducing total gate count (for example reducing to approximately 10K), reducing logic overhead (by approximately 60%) with area savings without any penalty in performance of the hardware accelerator. In one embodiment, the hybrid SM3 and SHA acceleration processor integrates round computation and message scheduling in the processors for providing area optional configuration in processors as well as accelerating field programmable gate array platforms. In one embodiment, the message scheduling selectively operating in one of a SHA mode or an SM3 mode to generate a sequence of message words based on an incoming message. In one embodiment, the round computation selectively operating in one of the SHA mode or the SM3 mode to perform at least one of a message expansion or a message compression based on at least one message word of the sequence of message words.

Figure 1:
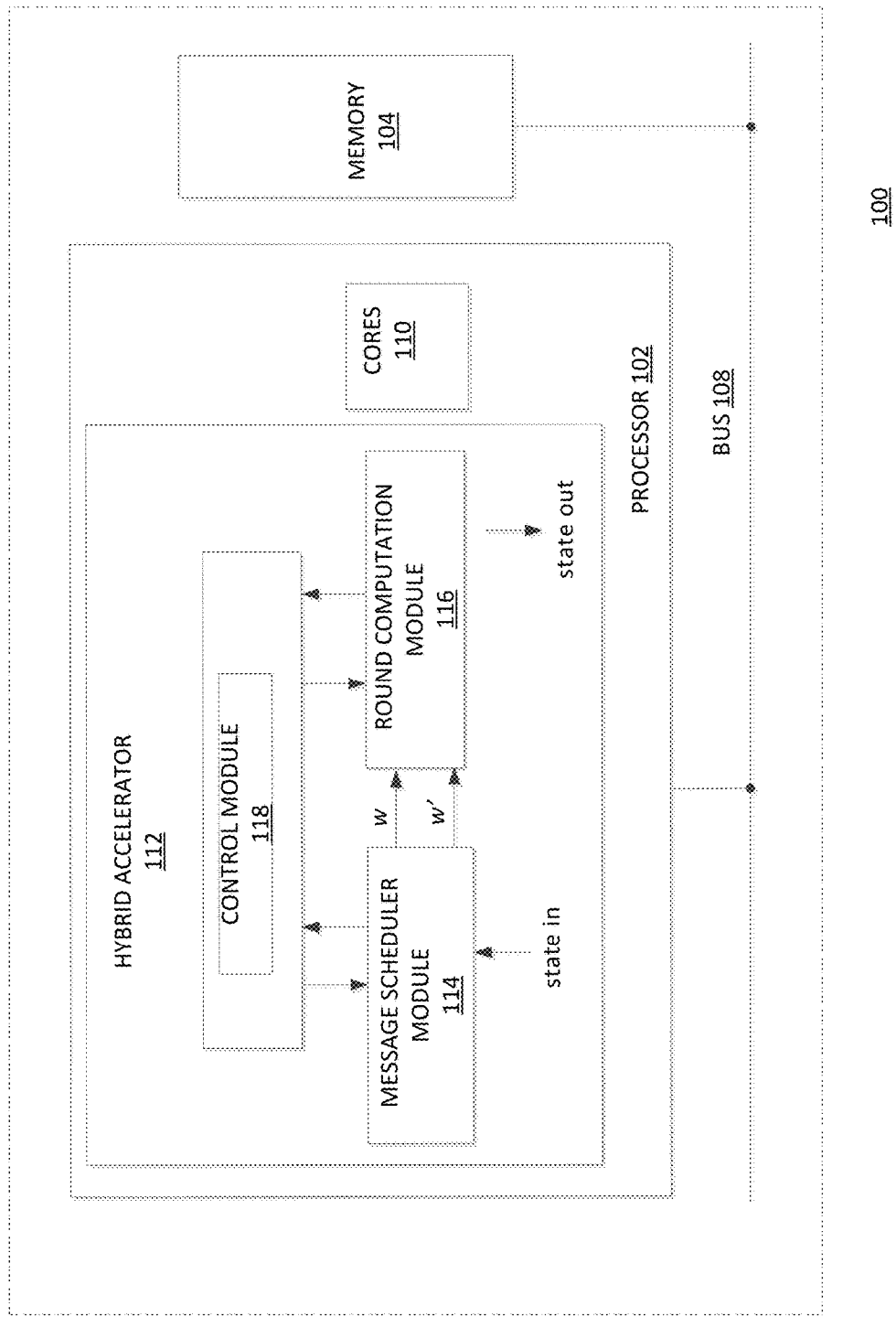
FIG. 1 illustrates a system-on-a-chip (SoC) including a processing system of a hybrid SM3 and SHA hardware accelerator to perform cryptography according an embodiment of the present disclosure.

FIG. 1 illustrates a system-on-a-chip (SoC) 100 including a processing system according to an embodiment of the present disclosure. The SoC 100 may include a processor (such as a central processing unit (CPU)) 102 and a memory that are connected to each other via a bus system 108. The processor 102 may execute tasks such as system applications and user applications using the memory 104 to store the instructions of the programs and data associated with the programs.

In one embodiment, the processor 102 may also include one or more processing cores 110 and a hardware accelerator 112 communicatively coupled to the processing core 110. In one embodiment, the hardware accelerator (a.k.a. hybrid accelerator) 112 functions as a hybrid SM3 and SHA accelerator integrating round computation and message scheduling in the processors.

The hybrid accelerator 112 includes a message scheduler module 114 for receiving an input message, i.e. current (original) state in including 256 bits. In one embodiment, the input message having a message length of l is composed of multiple blocks of 512 bits each of which is preprocessed by padding (not shown) with a bit "1" followed by k bits of "0" and then the message length l, where k is a smallest non-negative solution to the equation l+k+1=448 mod 512. After the padding of the input message, each block of the padded message is fed to 64 cycles of message expansion and message compression function using the message scheduler module 114.

In one embodiment, for message expansion function, the 512-bit block Bi is subdivided into 16 of 32 bit words (w0, w1 ... w15) so each of the 512-bit block, Bi is viewed as a 16 of 32-bit blocks. Accordingly, for message expansion, the message scheduler module 114 processes each of the Bi and expands to form 68 32-bit blocks w and 64 32-bit blocks w'. In one embodiment, in the SHA mode, the message scheduler module 114 forms a new message word, w in every cycle. In one embodiment, in the SM3 mode, the message scheduler module 114 forms a new pair of the message words w and w'.

In one embodiment, the message compression function requires eight 32 bit variables (A, B, C, D, E, F, G and H) that are sequentially mixed among each other and a new message word is created for each cycle. The message compression function is applied for 64 cycles.

The hybrid accelerator 112 also includes a round computation module 116, which receives from the message scheduler module 114, the message words w and w' and a current (original) state in, which is an initial or previous hash value. In one embodiment, the initial hash value is a constant defined in the standard, which may be implemented in a memory (example ROM) or supplied by the user. The previous hash value is the hash value previously generated by the round computation module 116. The round computation module 116 performs hashing calculations and operations on the message word w in SHA mode or the pair of message words w and w' in the SM3 mode and a state in (initial or previous hash value) for all 64 rounds/cycles using a round-specific constant to generate a new or another state out. This new or another state out is a new or another state in (i.e. new or another hash value) of a new or another input message.

The hybrid accelerator 112 also includes a control module 118, which controls functions of the message scheduler module 114 and the round computation module 116. In one embodiment, the control functions for the SM3 and SHA are similar. The 512-bit message is loaded into a message register (not shown) in the message scheduler 114 in the first 16 cycles, 32 bits at a time. In one embodiment, the next 64 cycles, the control module 118 enables digest computation in the round computation module 116 and enables message expansion in the message scheduler 114 in parallel, which is followed by outputting contents of a state register (not shown) in the round computation module 116.

Figure 2:
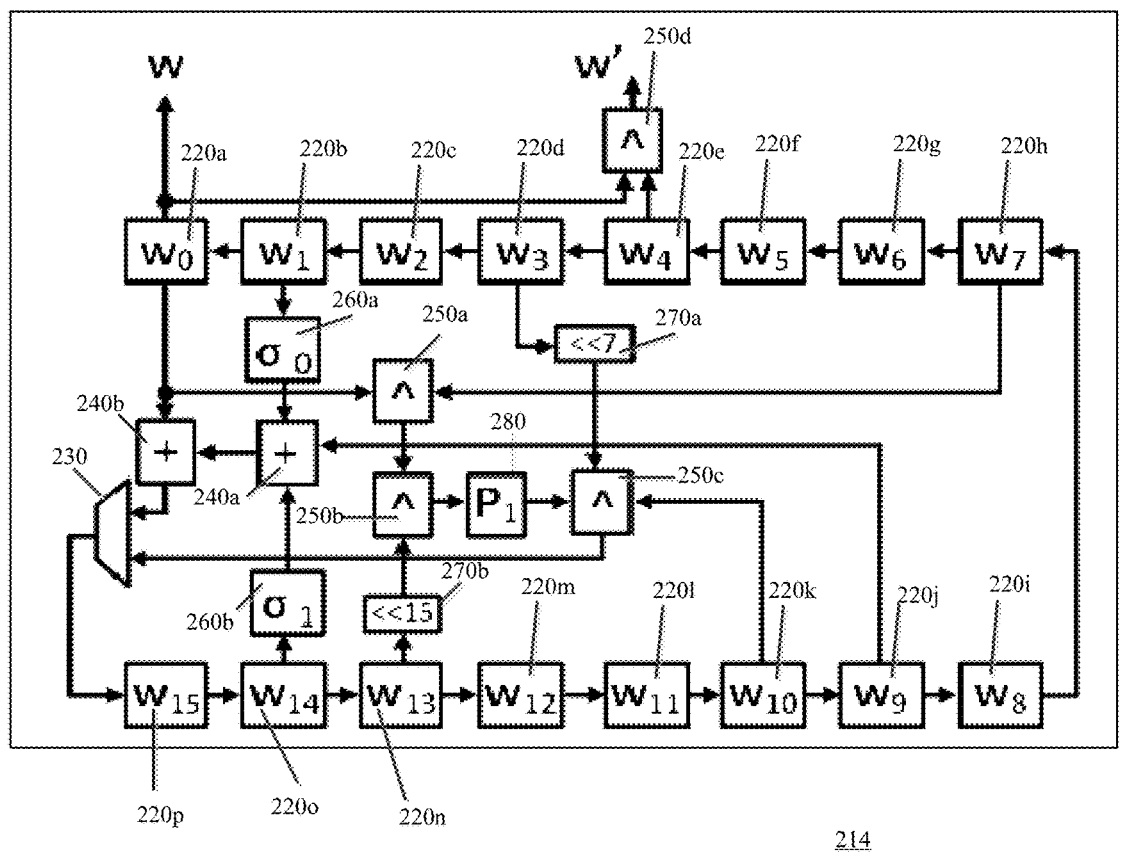
FIG. 2 illustrates an example of a logic diagram of an integrated message scheduling module of the hybrid SM3 and SHA hardware accelerator in the processing system of FIG. 1 according to an embodiment of the present disclosure.

FIG. 2 illustrates a detailed logic diagram of a message scheduler module 214 in accordance with an embodiment of the present disclosure. The message scheduler module 214 is same as the message scheduler module 114 of FIG. 1. As discussed above, the message scheduler module 214 functions to generate the message word w in SHA mode or the pair of message words w and w' in the SM3 mode.

In one embodiment, the message module 214 includes a plurality of message registers, W220 such as W0 220a, W1 220b, W2 220c, W3 220d, W4 220e, W5 220f, W6 220g, W7 220h, W8 220i, W9 220j, W10 220k, W11 2201, W12 220m, W13 220n, W14 220o and W15 220p. As discussed above, the message scheduler module 214 receives an input message, i.e. state in having a message length of l is composed of multiple blocks of 512 bits, which is subdivided into 16 of 32 bit words (w0, w1 ... w15). In one embodiment, for each cycle out of the 16 cycles one word is read from the input message. Accordingly, in first cycle, each of the message registers W0 220a, W1 220b, W2 220c, W3 220d, W4 220e, W5 220f, W6 220g, W7 220h, W8 220i, W9 220j, W10 220k, W11 2201, W12 220m, W13 220n, W14 220o and W15 220p are populated with 32 bit words of w0, w1, w2, w3, w4, w5, w6, w7, w8, w9, w10, w11, w12, w13, w14 and w15 respectively.

The hybrid message scheduler module 214 includes a multiplexer 230, add operations 240a and 240b, X-OR operations 250a, 250b, 250c, and 250d, sigma functions 260a and 260b, rotation operations 270a and 270b, and a standard function/logic P1 280.

In one embodiment, the standard function/logic P1 280 is defined for and functions only in the SM3 mode. In one embodiment, the X-OR operations 250a, 250b, 250c, and 250d function only in the SM3 mode. In one embodiment, the rotation operations 270a and 270b function only in the SM3 mode. In one embodiment, the sigma functions 260a and 260b and add operations 240a and 240b function only in SHA mode.

In one embodiment, in the SHA mode, the word from the message register W1 220b is inputted into the sigma functions 260a, output of which is an input into the add operation 240a. Also, the word from the message register W14 220o is inputted into the sigma functions 260b, output of which is also an input into the add operation 240a. Another input to the add operation 240a is the word from the message register W9 220j. The add operation 240b functions to add the output of the add operation 240a and the word from the message register W0 220a. The output of the add operation 240a is inputted into the multiplexer 230, output of which is a word, which is sent and stored into the message register W15 220p and the word already in the message register W15 220p is shifted to the message register W14 220o, the word already in the message register W14 220o is shifted to the message register W13 220n. This process of shifting continues until the message register W0 220a is populated with the word from the message register W1 220b. The word currently in the message register W0 220a is the w in the SHA mode.

In one embodiment, in the SM3 mode, the word from the message register W0 220a and the word from the message register W7 220h are inputted into the X-OR operation 250a, output of which is an input to the X-OR operation 250b. Also, the word from message register W13 220n is rotated by a rotation operation 270b, which in this example, the 32 bits word is shifted into left by 15 bits, output of which is also the input to the X-OR operation 250b. As such, the shifted version of the W13 220n is X-ORed with W0 220a and W7 220h, the output of which is inputted into the standard function/logic P1 280. In one embodiment, P1 280 is a permutation function in message extension defined in the SM3 standard. The P1 280 generates an another 32 bit word, which is inputted into the X-OR operation 250c. Also, inputted into the X-OR operation 250c is the word from the message register W10 220k. Also, the word from the message register W3 220d is rotated by a rotation operation 270a, which in this example, the 32 bits word is shifted into left by 7 bits, output of which is also inputted into the X-OR operation 250c. As such, the another 32 bit word is X-ORed with word from the message register W10 and the shifted version of the W3 220d. The output of the X-OR operation 250c is an input into the multiplexer 230. Another input into the multiplexer 230 is a word retrieved from message register W0 220*a*. The output of the multiplexer 230 generates a word which is sent and stored into the message register W15 220*p* and the word already in the message register W15 220*p* is shifted to the message register W14 220*o*, the word already in the message register W14 220*o* is shifted to the message register W13 220*d*. This process of shifting continues until the message register W0 220*a* is populated with the word from the message register W1 220*b*. The word currently in the message register is the w in the SM3 mode and this word is X-ORed with the word from the message register W4 220*e* using the X-OR operation 250*d* to generate w' in the SM3 mode.

Figure 3:
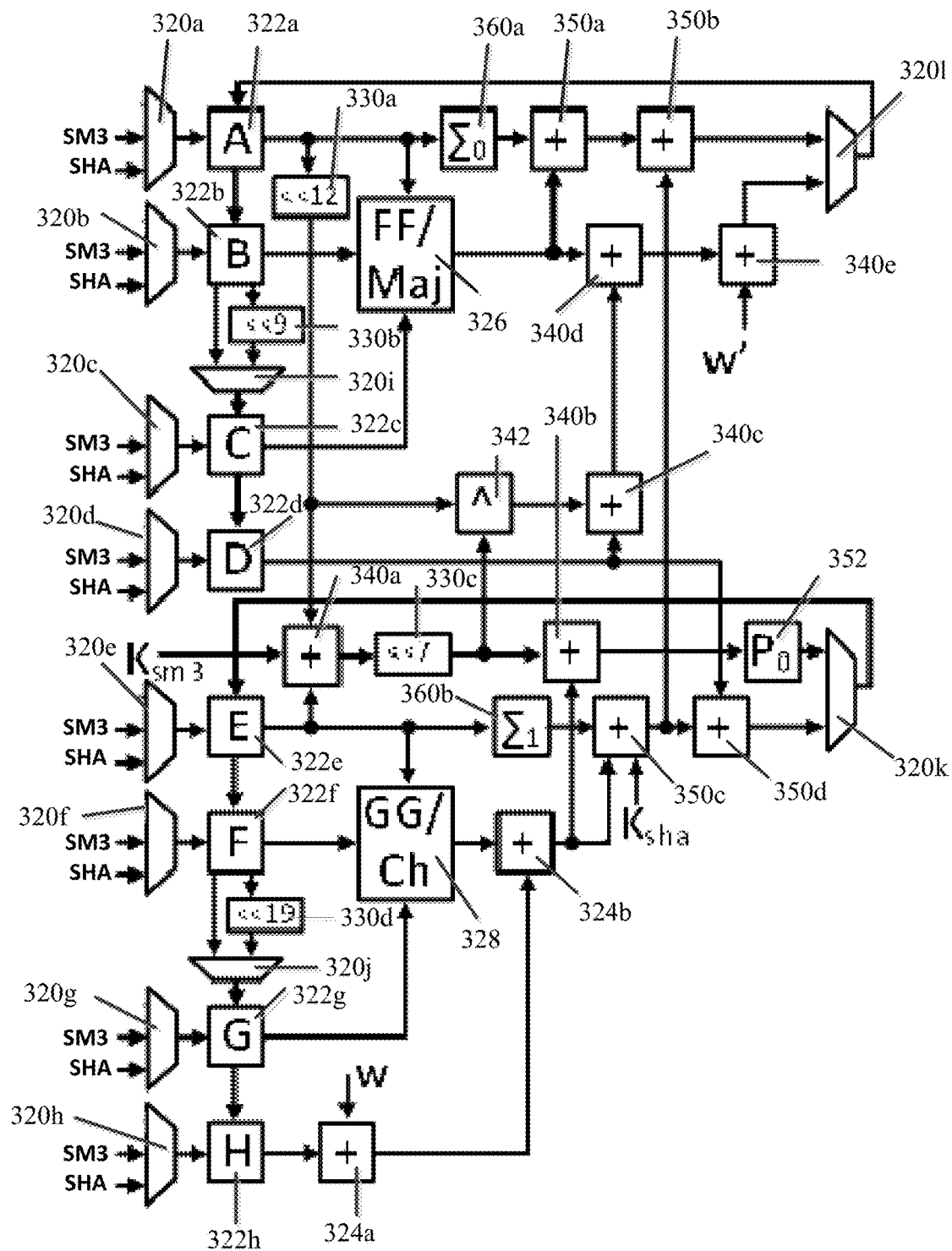
FIG. 3 illustrates an example of a logic diagram of an integrated round computation module of the hybrid SM3 and SHA hardware accelerator in the processing system of FIG. 1 according to an embodiment of the present disclosure.

FIG. 3 illustrates a detailed logic diagram of a hybrid round computation module 316 in accordance with an embodiment of the present disclosure. The hybrid round computation module 316 is same as the hybrid round computation module 116 of FIG. 1. As discussed above, the hybrid round computation module 316 functions to performs hashing calculations and operations on the message word w in SHA mode or the pair of message words w and w' in the SM3 mode and the initial or previous hash value for all 64 rounds/cycles using a round-specific constant to generate a new or another state out. This new or another state out is a new or another state in (i.e. new or another hash value) of a new or another input message.

The hybrid round computation module 316 includes a plurality of multiplexers 320, such as 320*a*, 320*b*, 320*c*, 320*d*, 320*e*, 320*f*, 320*g* and 320*h* all of which function to identify one of a SM3 or SHA mode. In one embodiment, input to each of the multiplexers 320*a*, 320*b*, 320*c*, 320*d*, 320*e*, 320*f*, 320*g* and 320*h* is an original or a current in state, which as discussed above is an initial or previous hash value. The initial hash value is a known original in state provided by a user. This known original in state is different for the SHA mode and for the SM3 mode. The previous hash value is a current in state, which is previously generated by the hybrid round computation module 316. The output of the multiplexers 320*a*, 320*b*, 320*c*, 320*d*, 320*e*, 320*f*, 320*g* and 320*h* are the initial or previous hash value in the SHA or an SM3 mode, which is an input to a plurality of state registers 322*a*, 322*b*, 322*c*, 322*d*, 322*e*, 322*f*, 322*g* and 322*h* respectively. Accordingly, each of the state registers 322*a*, 322*b*, 322*c*, 322*d*, 322*e*, 322*f*, 322*g* and 322*h* are loaded with a known in state (hash value). In one embodiment, each of the state registers 322*a*, 322*b*, 322*c*, 322*d*, 322*e*, 322*f*, 322*g* and 322*h* are 32 bits together forming a 256 bit entity.

The hybrid round computation module 316 also includes multiplexers 320*i*, 320*j*, 320*k* and 320*l* and add operations 324*a* and 324*b*. The hybrid computation module 316 also includes shared logic functions FF/Maj 326 and GG/Ch 328, which are built-in integrated functions and operate as mixing operations. In one embodiment, the shared logic function FF/Maj 326 operates as FF function only in the SM3 mode and the shared logic function GG/Ch 328 operates as GG function only in the SM3 mode. In one embodiment, the shared logic function FF/Maj 326 operates as Maj function only in the SHA mode and the shared logic function GG/Ch 328 operates as Ch function only in the SHA mode. The hybrid round computation module 316 also includes rotation operations 330*a*, 330*b*, 330*c*, and 330*d*, all of which function only in the SM3 mode. The hybrid round computation module 316 also includes add operations 340*a*, 340*b*, 340*c* and 340*d*, and an X-OR operation 342 all of which function only in the SM3 mode. In one embodiment, a constant value Ksm3 is defined only in the SM3 mode. The hybrid round computation module 316 also includes add operations 350*a*, 350*b*, 350*c* and 350*d*, which function only in the SHA mode.

The hybrid round computation module 316 also includes sigma functions such as summation operations 360*a* and 360*b*, which function only in the SM3 mode. In one embodiment, a constant value Ksha is defined only in the SHA mode.

In one embodiment, in the SM3 mode, during the first cycle, the hash value of the state register 322*a* is rotated by a rotation operation 330*a*, which in this example, the hash value is shifted into left by 12 bits, output of which is also an input to the X-OR operation 342. The output of the X-OR operation 342 is an input to the add operation 340*c*. Other inputs to the add operation 340*c* is the hash value of the state register 322*d*. The output of the add operation 340*c* is an input to the add operation 340*d*. Another input to the add operation 340*d* is the hash value of the state register 322*b*, the hash value of the state register 322*c* and the logic function FF 326. The output of the add operation 340*c* is added to the message word w' via the add operation 340*e*. The output of the add operation 340*e* is sent to the multiplexer 320*l*, output of which is sent to be loaded as a new hash value of the state register 322*a*. The previous value of the state register 322*a* is shifted and loaded into the state register 322*b* as new hash value for the state register 322*b*. The previous value of the state register 322*b* is sent to a rotation operation rotation operation 330*b*, which in this example, the hash value is shifted into left by 9 bits, output of which is also an input to the multiplexer 320*i*, output of which is loaded into the state register 322*c* as new hash value for the state register 322*c*. The previous value of the state register 322*c* is shifted and loaded as a new hash value for the state register 322*d*. In one embodiment, the message word w is added to the hash value in the state register 322*h* via the add operation 324*a*, output of which is an input to the add operation 324*b*. Other inputs to the add operation 324*b* is the hash value in the state register 322*f*, the hash value in the state register 322*e* and the logic function GG 328. The output of the add operation 324*b* is an input to the add operation 340*b*. A constant Ksm3 is added to the hash value of the state register 322*e* and the output of the rotation operation 330*a* via the add operation 340*a*. In one embodiment, constant Ksm3 is a set of 64 32-bit constants listed in specification of the SM3. It is implemented in a memory (example, Read only memory) such that for any particular round, the memory generates the corresponding constant Ksm3. The output of the add operation 340*a* sent to a rotation operation 330*c*, which in this example, the hash value is shifted left by 9 bits, output of which is an input to the X-OR operation 342 and the add operation 340*b*. Other inputs to the X-OR operation 342 are the output of the rotation operation 330*a* and the output of the X-OR operation is an input to the add operation 340*c* as described above. The output of the add operation 340*b* and P0 352 is sent to the multiplexer 320*k*, output of which is sent to the state register 322*e* to be loaded as a new hash value for the state register 322*e*. In one embodiment, P0 352 is a permutation function in compression function defined in the SM3 standard. The previous value of the state register 322*e* is shifted and loaded into the state register 322*f* as new hash value for the state register 322*f*. The previous value of the state register 322*f* is sent to a rotation operation rotation operation 330*d*, which in this example, the hash value is shifted into left by 19 bits, output of which is also an input to the multiplexer 320*j*, output of which is loaded into the state register 322*g* as new hash value for the state register 322*g*. The previous value of the state register 322*g* is shifted and loaded as a new hash value for the state register 322*h*. In one embodiment, the process described above repeats for another 63 cycles, thus resulting in 64 cycles of round computation. After the 64$^{th}$ cycle, the hash values of each of the state registers is the state out in the SM3 mode. In one embodiment, this state out will be the state in for the next round of the 64 cycles of round computation in the SM3 mode.

In one embodiment, in the SHA mode, during the first cycle, the hash value of the message register 322a is send as an input to the summation operation 360a, output of which is an input to the add operation 350a. Another input to the add operation 350a is a combination of the hash value of the message register 322a, hash value of the state register 322b and the logic function Maj 326. The output of the add operation 350a is added to the output of the add operation 340d (described above) via the add operation 350b. The output of the add operation 350b is sent to the multiplexer 320l, output of which is sent to be loaded as a new hash value of the state register 322a. The previous value of the state register 322a is shifted and loaded into the state register 322b as new hash value for the state register 322b. The previous value of the state register 322b is sent to the multiplexer 320i, output of which is loaded into the state register 322c as new hash value for the state register 322c. The previous value of the state register 322c is shifted and loaded as a new hash value for the state register 322d. In one embodiment, the message word w is added to the hash value in the state register 322h via the add operation 324a, output of which is an input to the add operation 324b. Other inputs to the add operation 324b is the hash value in the state register 322f, the hash value in the state register 322e and the logic function Ch 328. The output of the add operation 324b is an input to the add operation 350c. Another input to the add operation 350c is the constant Ksha. In one embodiment, constant Ksha is a set of 64 32-bit constants listed in specification of the SHA. It is implemented in a memory (example, Read only memory) such that for any particular round, the memory generates the corresponding constant Ksha. The hash value of the state register 322e is an input to the summation operation 360b, output of which is an input to the add operation 350c. Thus the add operation 350c adds the output of the add operation 324b, the constant Ksha and the output of the summation operation 360b. The output of the add operation 350c is an input to the add operation 350d and the add operation 350b (described above). The add operation 350d adds the output of the add operation 350c with the hash value of the state register 322d. The output of the add operation 350d is sent to the multiplexer 320k, output of which is sent to the state register 322e to be loaded as a new hash value for the state register 322e. The previous value of the state register 322e is shifted and loaded into the state register 322f as new hash value for the state register 322f. The previous value of the state register 322f is sent to the multiplexer 320j, output of which is loaded into the state register 322g as new hash value for the state register 322g. The previous value of the state register 322g is shifted and loaded as a new hash value for the state register 322h. In one embodiment, the process described above repeats for another 63 cycles, thus resulting in 64 cycles of round computation. After the 64$^{th}$ cycle, the hash values of each of the state registers is the state out in the SHA mode. In one embodiment, this state out will be the state in for the next round of the 64 cycles of round computation in the SHA mode. In one embodiment, in the SHA mode, FF function is used similar to the SM3 mode for the first 16 cycles. After the 16 cycles, the Maj function is used in the SHA mode until the 64 cycles are completed. In one embodiment, in the SHA mode, the GG function is used similar to the SM3 mode for the first 16 cycles. After the 16 cycles, the value Ch function is used in the SHA mode until the 64 cycles are completed. Since, the FF and the GG functions needed for SM3 are already present in an engine of the SHA, these functions are used similarly for the SM3 for the first 16 cycles without a need to redesign these functions for the SM3.

Figure 4:
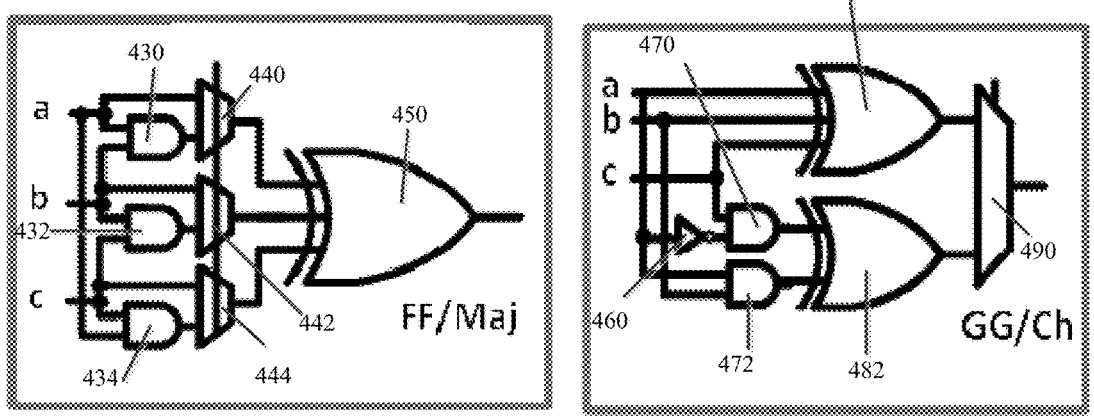
FIGS. 4a and 4b illustrate an example of logic circuits of a mixing operation of the logic diagram of the integrated round computation module of the hybrid SM3 and SHA hardware accelerator in the processing system of FIG. 3 according to an embodiment of the present disclosure.

FIG. 4A illustrates a circuit diagram of a shared logic function FF/Maj 426 in accordance with an embodiment of the present disclosure. The shared logic function FF/Maj 426 is same as the shared logic function FF/Maj 326 of FIG. 3. As discussed above, the shared logic function FF/Maj 426 operates as the FF function only in the SM3 mode and as the Maj function only in the SHA mode.

In one embodiment, the shared logic function FF/Maj 426 includes three AND gates 430 432, and 434, three multiplexers 440, 442 and 444 and an X-OR gate 450. In one embodiment, input to the AND gate 430 is a hash value a of a first state register (not shown) and a hash value b of a second state register (not shown). Input to the AND gate 432 is the hash value b of the second state register (not shown) and a hash value c of a third state register (not shown) and input to the AND gate 434 is a hash value a of the first state register (not shown) and the hash value c of the third state register (not shown). Input to the multiplexer 440 is the hash value a and output of the AND gate 430. Input to the multiplexer 442 is the hash value b and output of the AND gate 432. Input to the multiplexer 444 is the hash value c and the output of the AND gate 434. The output of the three multiplexers 440, 442 and 444 is an input to the X-OR gate 450, output of which is the value, FF in the SM3 mode and is the value of Maj in the SHA mode. As discussed above, in one embodiment, in the SHA mode, the value FF (FF function) is used similar to the SM3 mode for the first 16 cycles. After the 16 cycles, the value Maj (Maj function) is used in the SHA mode until the 64 cycles are completed.

FIG. 4B illustrates circuit diagram of the shared logic function GG/Ch 428 in accordance with an embodiment of the present disclosure. The shared logic function GG/Ch 428 is same as the shared logic function GG/Ch 328 of FIG. 3. As discussed above, the shared logic function GG/Ch 428 operates as the GG function only in the SM3 mode and as the Ch function only in the SHA mode.

In one embodiment, the shared logic function GG/Ch 428 includes a NOT gate 460, two AND gates 470 and 472, two X-OR gates 480 and 482 and a multiplexer 490 In one embodiment, input to the NOT gate 460 is a hash value a of a first state register (not shown). The input to the AND gate 470 is an output of the NOT gate 460 and a hash value c of a third state register (not shown). The input to the AND gate 472 is a hash value a of the first state register (not shown) and a hash value b of a second state register (not shown). The output of the AND gates 470 and 472 is an input to the X-OR gate 482. The input to the X-OR gate 480 are the hash values a, b and c. The output of the X-OR gates 480 and 482 are the inputs to the multiplexer 490, output of which is the value, GG in the SM3 mode and is the value of Ch in the SHA mode. As discussed above, in one embodiment, in the SHA mode, the value GG (GG function) is used similar to the SM3 mode for the first 16 cycles. After the 16 cycles, the value Ch (Ch function) is used in the SHA mode until the 64 cycles are completed.

Figure 5:
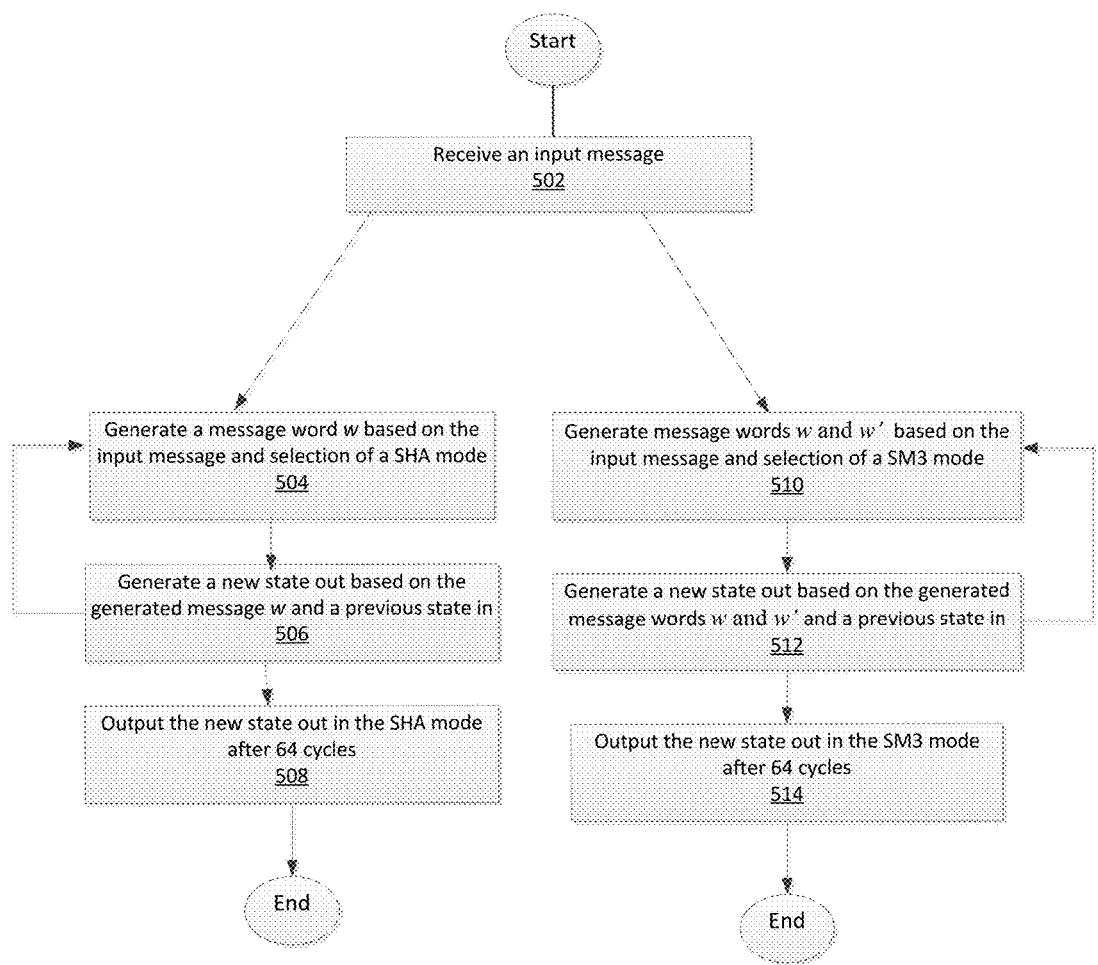
FIG. 5 illustrates a flow diagram of integrating round computation and message scheduling in the processors according to an embodiment of the present disclosure.

FIG. 5 illustrates a flow diagram of a method for integrating round computation and message scheduling in the processors in accordance with an embodiment of the present disclosure. Method 500 may be performed by processing logic that may include hardware (e.g., circuitry, dedicated logic, programmable logic, microcode, etc.), software (such as instructions run on a processing system, a general purpose computer system, or a dedicated machine), firmware, or a combination thereof. In one embodiment, method 500 may be performed, in part, by processing logics of any one of processing cores 110 executing an operating system with respect to FIG. 1.

For simplicity of explanation, the method 500 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 500 could alternatively be represented as a series of interrelated states via a state diagram or events.

Referring to FIG. 5, at block 502, the processing logic receives an input message. As discussed above, the input message includes 256 bits, which is preprocessed by padding. At block 504, the processing logic generates a message word w based on the input message and a selection of a SHA mode. In one embodiment, a user selects the SHA mode. At block 506, the processing logic generates a new state out (i.e. new hash value) based on the generate message w and a previous state in (i.e. previous hash value). In one embodiment, the previous state value is an original value provided by a user. In one embodiment, the previous state value is the hash value previously generated. Blocks 504 and 506 are processed for 64 cycles. At block 508, the new state out in the SHA mode is outputted after the $64^{th}$ cycle. At block 510, the processing logic generates message words w and w' based on the input message and a selection of a SM3 mode. In one embodiment, a user selects the SM3 mode. At block 512, the processing logic generates a new state out (i.e. new hash value) based on the generate message words w and w' and a previous state in (i.e. previous hash value). In one embodiment, the previous state value is an original value provided by a user. In one embodiment, the previous state value is the hash value previously generated. Blocks 510 and 512 are processed for 64 cycles. At block 514, the new state out in the SM3 mode is outputted after the $64^{th}$ cycle.

Figure 6A:
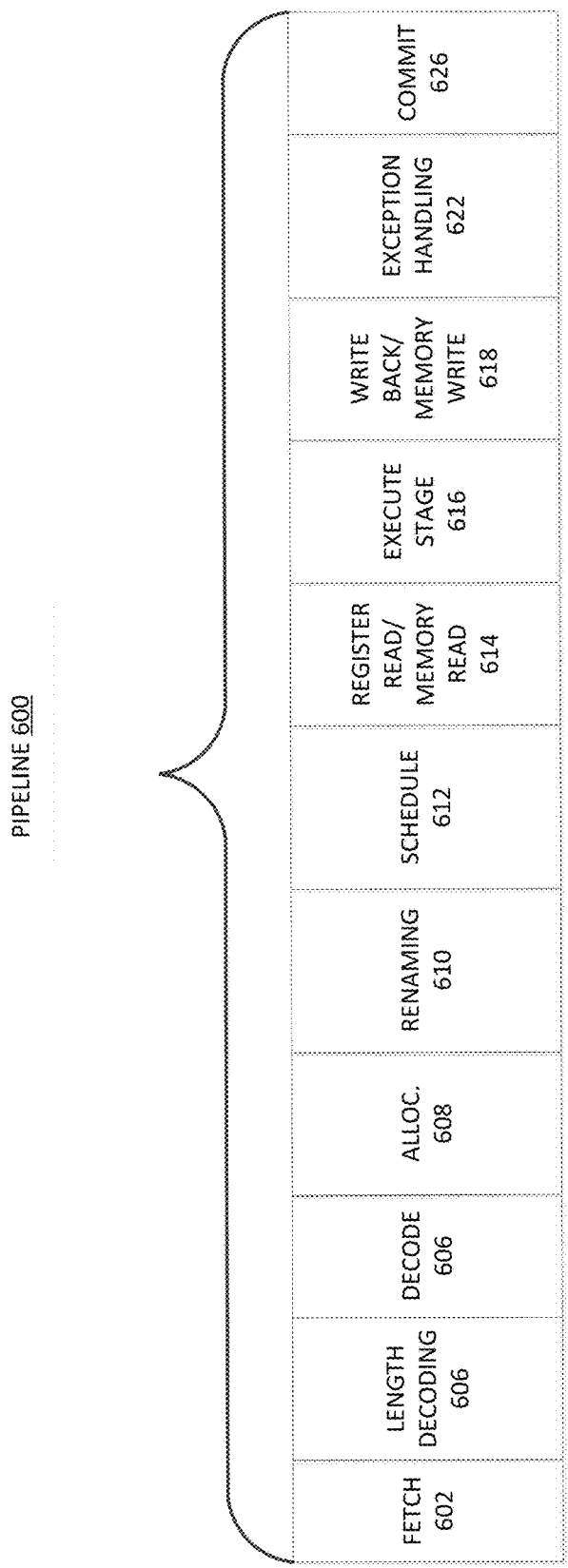
FIG. 6A is a block diagram illustrating a micro-architecture for a processor in which one embodiment of the disclosure may be used.
Figure 6B:
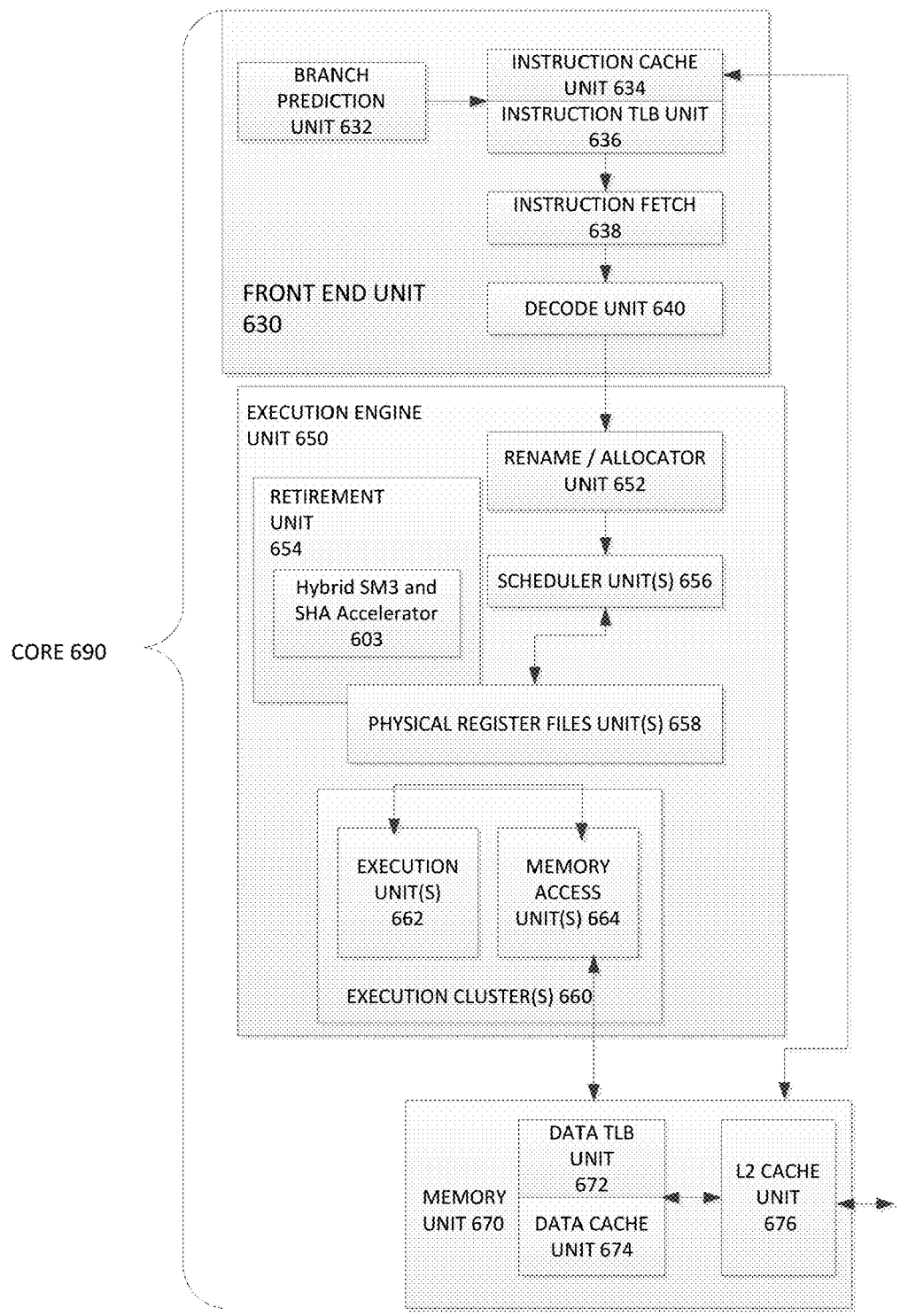
FIG. 6B is a block diagram illustrating an in-order pipeline and a register renaming stage, out-of-order issue/execution pipeline implemented according to at least one embodiment of the disclosure.

FIG. 6A is a block diagram illustrating an in-order pipeline and a register re-naming stage, out-of-order issue/execution pipeline of a processor monitoring performance of a processing device to manage non-precise events according to at least one embodiment of the invention. FIG. 6B is a block diagram illustrating an in-order architecture core and a register renaming logic, out-of-order issue/execution logic to be included in a processor according to at least one embodiment of the invention. The solid lined boxes in FIG. 6A illustrate the in-order pipeline, while the dashed lined boxes illustrates the register renaming, out-of-order issue/execution pipeline. Similarly, the solid lined boxes in FIG. 6B illustrate the in-order architecture logic, while the dashed lined boxes illustrates the register renaming logic and out-of-order issue/execution logic.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the stages are provided in a different order and different stages may be considered in-order and out-of-order.

In FIG. 6B, arrows denote a coupling between two or more units and the direction of the arrow indicates a direction of data flow between those units. FIG. 6B shows processor core 690 including a front end unit 630 coupled to an execution engine unit 650, and both are coupled to a memory unit 70.

The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to a level 2 (L2) cache unit 676 in the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The retirement unit 654 may include a hybrid SM3 and SHA accelerator 603 integrating round computation and message scheduling in the processors according to embodiments of the invention. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and on various types of data (e.g., scalar floating point, packed integer, packed floating point, vector integer, vector floating point).

While some embodiments may include a number of execution units dedicated to specific functions or sets of functions, other embodiments may include one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The L2 cache unit 676 is coupled to one or more other levels of cache and eventually to a main memory.

By way of example, the exemplary register renaming, out-of-order issue/execution core architecture may implement the pipeline 600 as follows: 1) the instruction fetch 38 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in-order architecture. While the illustrated embodiment of the processor also includes a separate instruction and data cache units 634/674 and a shared L2 cache unit 676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 7:
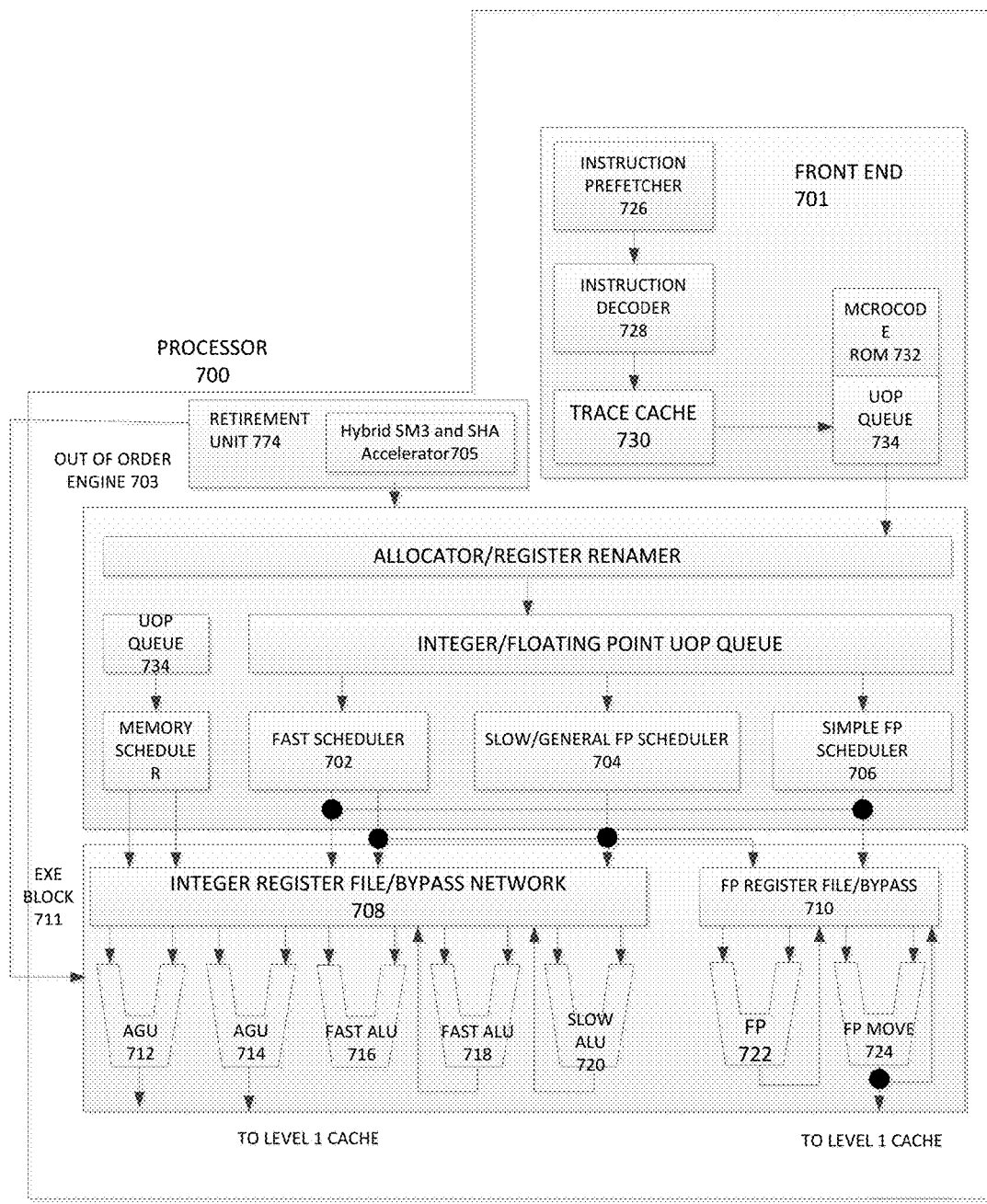
FIG. 7 illustrates a block diagram of the micro-architecture for a processor in accordance with one embodiment of the disclosure.

FIG. 7 is a block diagram illustrating a micro-architecture for a processor 700 that includes logic circuits to perform instructions in accordance with one embodiment of the invention. In one embodiment, processor 700 monitors performance of a processing device to manage non-precise events. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline. The front end 701 may include several units. In one embodiment, the instruction prefetcher 726 fetches instructions from memory and feeds them to an instruction decoder 728, which in turn decodes or interprets them. For example, in one embodiment, the decoder decodes a received instruction into one or more operations called "micro-instructions" or "micro-operations" (also called micro op or uops) that the machine can execute.

In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others use several micro-ops to complete the full operation. In one embodiment, if more than four micro-ops are needed to complete an instruction, the decoder 728 accesses the microcode ROM 732 to do the instruction. For one embodiment, an instruction can be decoded into a SM3 all number of micro ops for processing at the instruction decoder 728. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706 determine when a uop is ready to execute based on the readiness of their dependent input register operand sources and the availability of the execution resources the uops use to complete their operation. The fast scheduler 702 of one embodiment can schedule on each half of the main clock cycle while the other schedulers can schedule once per main processor clock cycle. The schedulers arbitrate for the dispatch ports to schedule uops for execution.

Register files 708, 710 sit between the schedulers 702, 704, 706, and the execution units 712, 714, 716, 718, 720, 722, 724 in the execution block 711. There is a separate register file for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 66 to 128 bits in width.

The execution block 711 contains the execution units 712, 714, 716, 718, 720, 722, 724, where the instructions are actually executed. This section includes the register files 708, 710, that store the integer and floating point data operand values that the micro-instructions use to execute. The processor 700 of one embodiment is comprised of a number of execution units: address generation unit (AGU) 712, AGU 714, fast ALU 716, fast ALU 718, slow ALU 720, floating point ALU 722, floating point move unit 724. For one embodiment, the floating point execution blocks 722, 724, execute floating point, MMX, SIMD, and SSE, or other operations. The floating point ALU 722 of one embodiment includes a 64 bit by 54 bit floating point divider to execute divide, square root, and remainder micro-ops. For embodiments of the invention, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. Memory load/store operations are executed by the AGUs 712, 714. For one embodiment, the integer ALUs 716, 718, 720 are described in the context of performing integer operations on 64 bit data operands. In alternative embodiments, the ALUs 716, 718, 720 can be implemented to support a variety of data bits including 16, 32, 128, 256, etc. Similarly, the floating point units 722, 724 can be implemented to support a range of operands having bits of various widths. For one embodiment, the floating point units 722, 724 can operate on 128 bits wide packed data operands in conjunction with SIMD and multimedia instructions.

In one embodiment, the uops schedulers 702, 704, 706 dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The processor 700 may include a retirement unit 754 coupled to the execution block 711. The retirement unit 754 may include a hybrid SM3 and SHA accelerator 705 integrating round computation and message scheduling in the processors.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data.

A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not differentiate between the two data types. In one embodiment, integer and floating point are contained in either the same register file or different register files. Furthermore, in one embodiment, floating point and integer data may be stored in different registers or the same registers.

Figure 8:
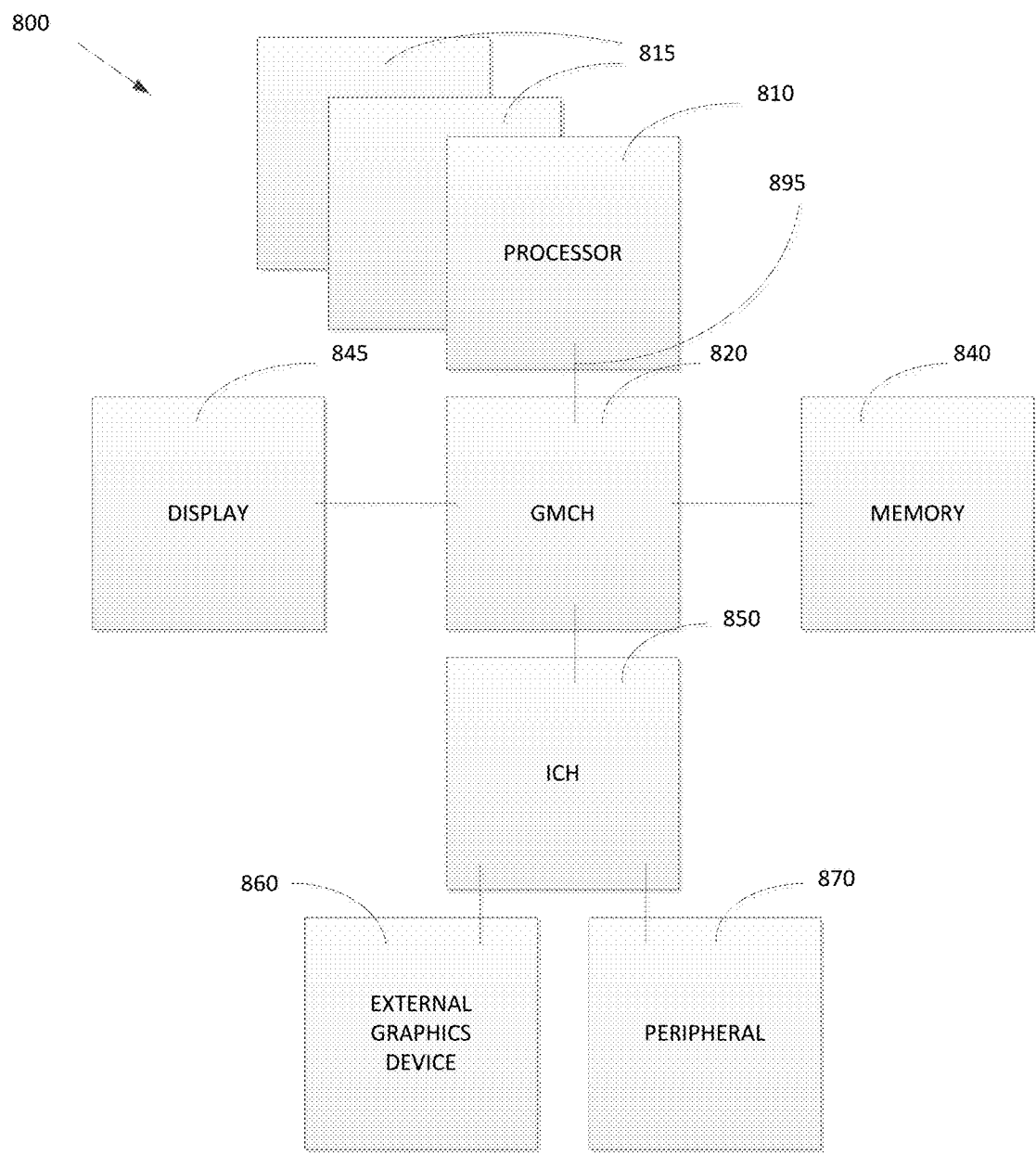
FIG. 8 is a block diagram illustrating a system in which an embodiment of the disclosure may be used.

Referring now to FIG. 8, shown is a block diagram of a system 800 in accordance with one embodiment of the invention. The system 800 may include one or more processors 810, 815, which are coupled to graphics memory controller hub (GMCH) 820. The optional nature of additional processors 815 is denoted in FIG. 8 with broken lines. In one embodiment, a processor 810, 815 monitors performance of a processing device to manage non-precise events.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
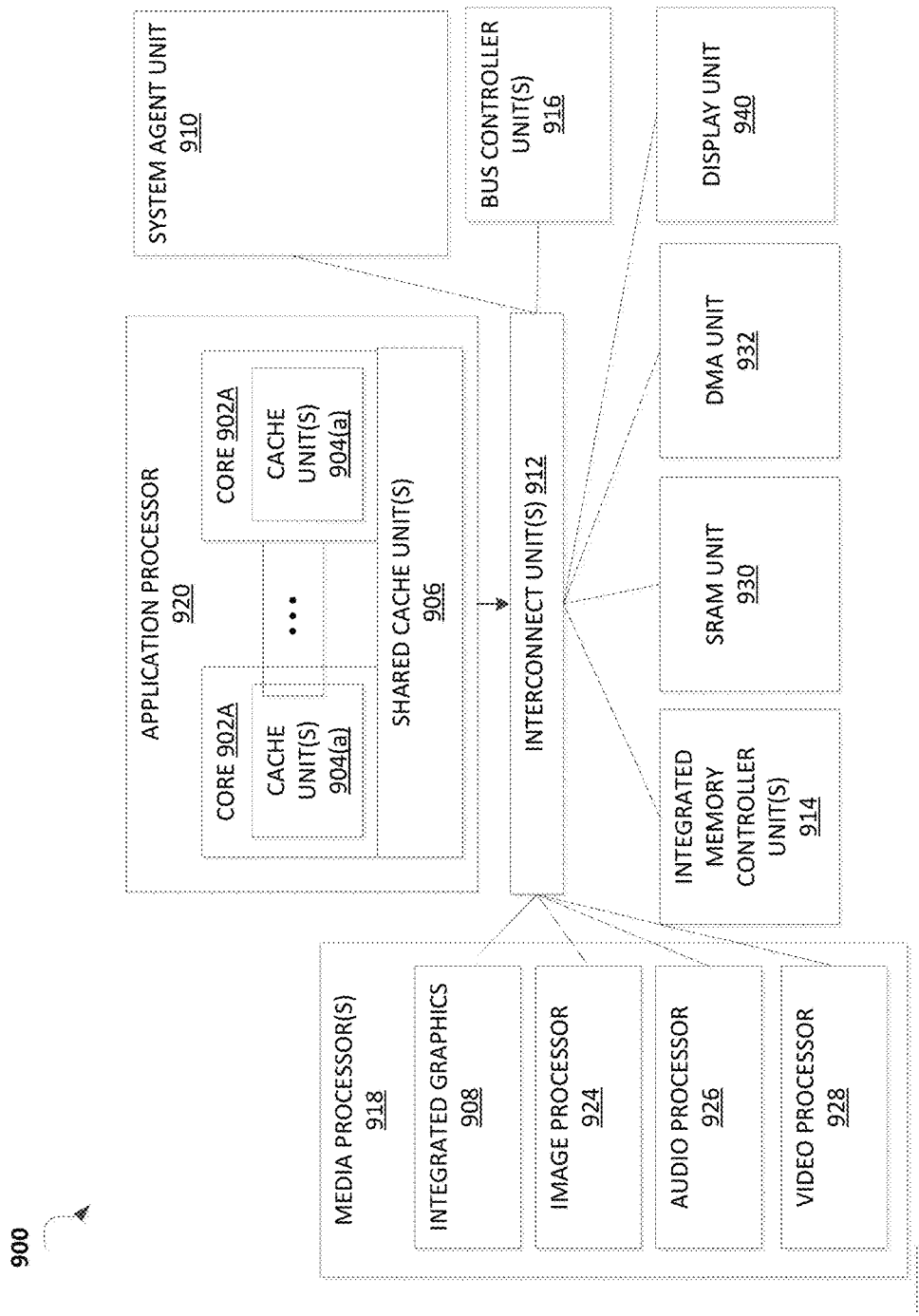
FIG. 9 is a block diagram of a system in which an embodiment of the disclosure may operate.

Embodiments may be implemented in many different system types. FIG. 9 is a block diagram of a SoC 900 in accordance with an embodiment of the present disclosure. Dashed lined boxes are optional features on more advanced SoCs. In FIG. 9, an interconnect unit(s) 912 is coupled to: an application processor 920 which includes a set of one or more cores 902A-N and shared cache unit(s) 906; a system agent unit 910; a bus controller unit(s) 916; an integrated memory controller unit(s) 914; a set or one or more media processors 918 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays. In one embodiment, a memory module may be included in the integrated memory controller unit(s) 914. In another embodiment, the memory module may be included in one or more other components of the SoC 900 that may be used to access and/or control a memory. The application processor 920 may include a conditional branch, indirect branch and event execution logics as described in embodiments herein.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof.

In some embodiments, one or more of the cores 902A-N are capable of multi-threading.

The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture and/or instruction set. For example, some of the cores 902A-N may be in order while others are out-of-order. As another example, two or more of the cores 902A-N may be capable of execution the same instruction set, while others may be capable of executing only a subset of that instruction set or a different instruction set.

The application processor 920 may be a general-purpose processor, such as a Core™ i3, i5, i7, 2 Duo and Quad, Xeon™, Itanium™, Atom™, XScale™ or StrongARM™ processor, which are available from Intel™ Corporation, of Santa Clara, Calif. Alternatively, the application processor 920 may be from another company, such as ARM Holdings™, Ltd, MIPS™, etc. The application processor 920 may be a special-purpose processor, such as, for example, a network or communication processor, compression engine, graphics processor, co-processor, embedded processor, or the like. The application processor 920 may be implemented on one or more chips. The application processor 920 may be a part of and/or may be implemented on one or more substrates using any of a number of process technologies, such as, for example, BiCMOS, CMOS, or NMOS.

Figure 10:
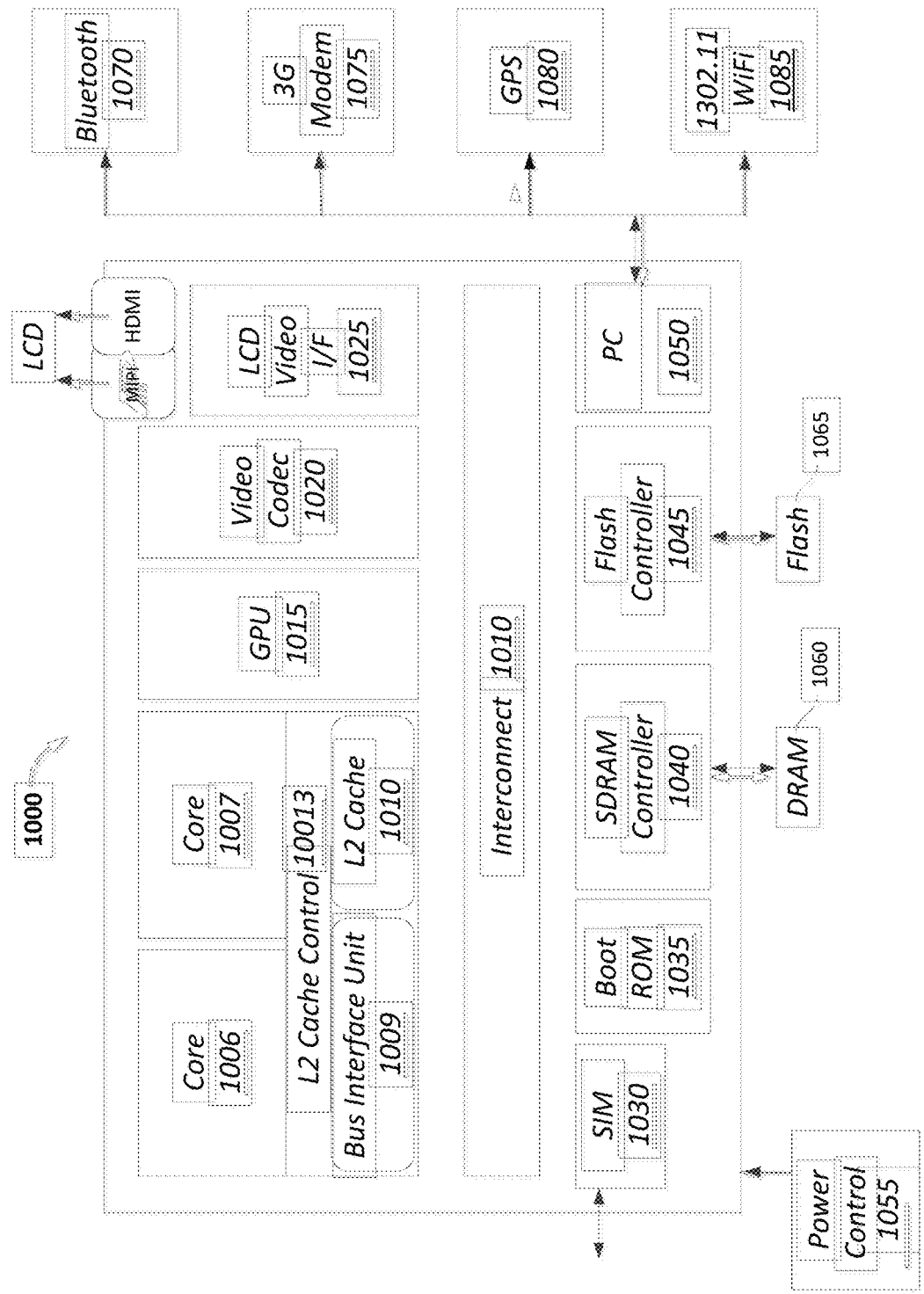
FIG. 10 is a block diagram of a system in which an embodiment of the disclosure may operate.

FIG. 10 is a block diagram of an embodiment of a system on-chip (SoC) design in accordance with the present disclosure. As a specific illustrative example, SoC 1000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1000 includes 2 cores-1006 and 1007. Cores 1006 and 1007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1006 and 1007 are coupled to cache control 1008 that is associated with bus interface unit 1008 and L2 cache 1010 to communicate with other parts of system 1000. Interconnect 1010 includes an on-chip interconnect, such as an IOSF, AMBA, or other interconnect discussed above, which potentially implements one or more aspects of the described disclosure. In one embodiment, a conditional branch, indirect branch and event execution logics may be included in cores 1006, 1007.

Interconnect 1010 provides communication channels to the other components, such as a Subscriber Identity Module (SIM) 1030 to interface with a SIM card, a boot ROM 1035 to hold boot code for execution by cores 1006 and 1007 to initialize and boot SoC 1000, a SDRAM controller 1040 to interface with external memory (e.g. DRAM 1060), a flash controller 1045 to interface with non-volatile memory (e.g. Flash 1065), a peripheral control 1050 (e.g. Serial Peripheral Interface) to interface with peripherals, video codecs 1020 and Video interface 1025 to display and receive input (e.g. touch enabled input), GPU 1015 to perform graphics related computations, etc. Any of these interfaces may incorporate aspects of the disclosure described herein. In addition, the system 1000 illustrates peripherals for communication, such as a Bluetooth module 1070, 3G modem 1075, GPS 1080, and Wi-Fi 1085.

Figure 11:
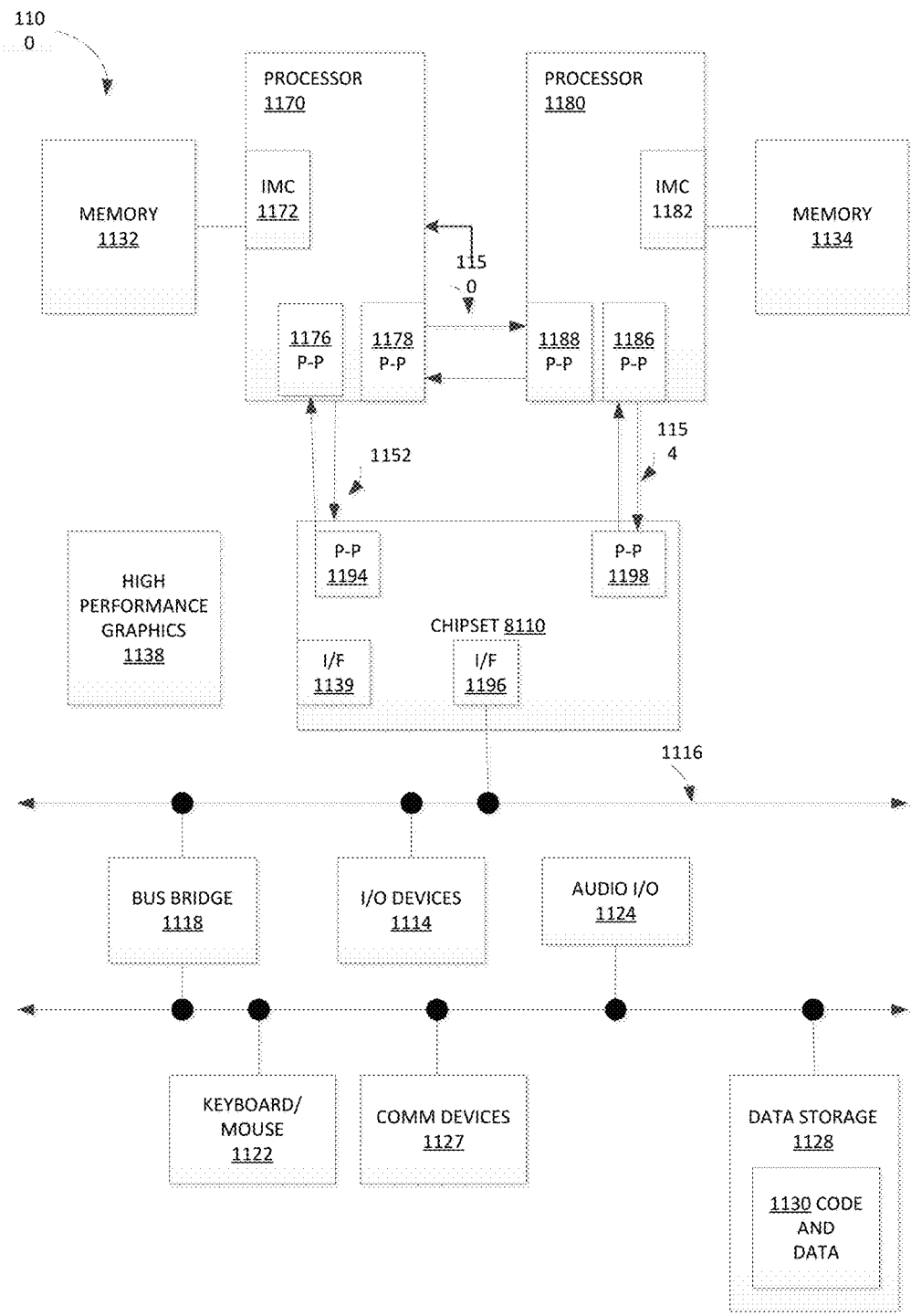
FIG. 11 is a block diagram of a System-on-a-Chip (SoC) in accordance with an embodiment of the present disclosure

Referring now to FIG. 11, shown is a block diagram of a system 1100 in accordance with an embodiment of the invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processors of the computing systems as described herein. In one embodiment, processors 1170, 1180 monitoring performance of a processing device to manage non-precise events to monitor performance of a processing device to manage non-precise events.

While shown with two processors 1170, 1180, it is to be understood that the scope of the disclosure is not so limited. In other embodiments, one or more additional processors may be present in a given processor.

Processors 1170 and 1180 are shown including integrated memory controller units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170 and 1180 may each exchange information with a chipset 1190 via individual P-P interfaces 1152, 1154 using point to point interface circuits 1176, 1194, 1186, 1198. Chipset 1190 may also exchange information with a high-performance graphics circuit 1138 via a high-performance graphics interface 1139.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1116. In one embodiment, first bus 1116 may be a Peripheral Component Interconnect (PCI) bus, or a bus such as a PCI Express bus or another third generation I/O interconnect bus, although the scope of the disclosure is not so limited.

As shown in FIG. 11, various I/O devices 1114 may be coupled to first bus 1116, along with a bus bridge 1118, which couples first bus 1116 to a second bus 1120. In one embodiment, second bus 1120 may be a low pin count (LPC) bus. Various devices may be coupled to second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to second bus 1120. Note that other architectures are possible. For example, instead of the point-to-point architecture of FIG. 11, a system may implement a multi-drop bus or other such architecture.

Figure 12:
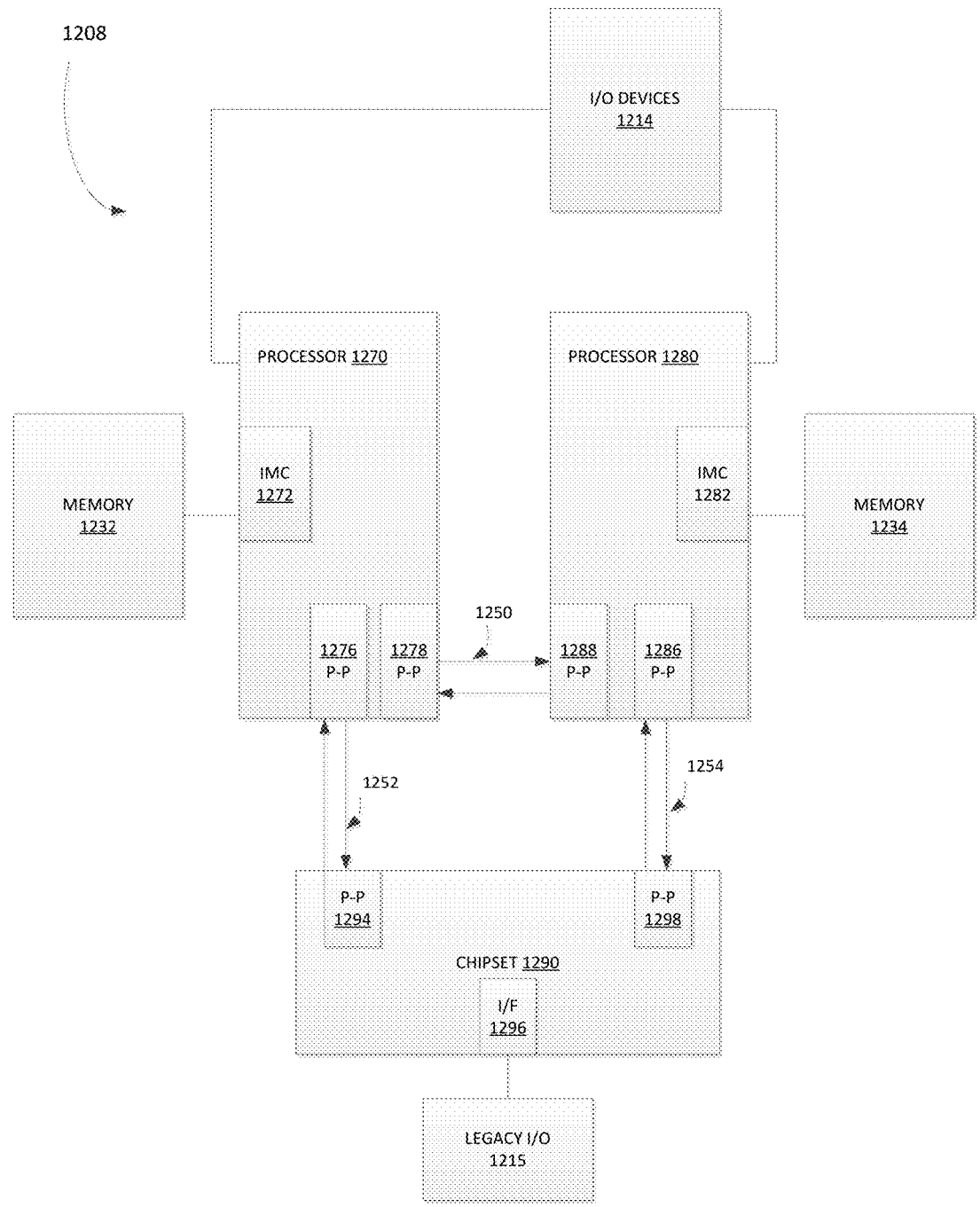
FIG. 12 is a block diagram of an embodiment of an SoC design in accordance with the present disclosure.

Referring now to FIG. 12, shown is a block diagram of a system 1200 in accordance with an embodiment of the invention. FIG. 12 illustrates processors 1270, 1280. In one embodiment, processors 1270, 1280 monitor performance of a processing device to manage non-precise events. Further-more, processors 1270, 1280 may include integrated memory and I/O control logic ("CL") 1272 and 1282, respectively and intercommunicate with each other via point-to-point interconnect 1250 between point-to-point (P-P) interfaces 1278 and 1288 respectively. Processors 1270, 1280 each communicate with chipset 1290 via point-to-point interconnect 1252 and 1254 through the respective P-P interfaces 1276 to 1294 and 1286 to 1298 as shown. For at least one embodiment, the CL 1272, 1282 may include integrated memory controller units. CLs 1272, 1282 may include I/O control logic. As depicted, memories 1232, 1234 coupled to CLs 1272, 1282 and I/O devices 1214 are also coupled to the control logic 1272, 1282. Legacy I/O devices 1215 are coupled to the chipset 1290 via interface 1296.

Figure 13:
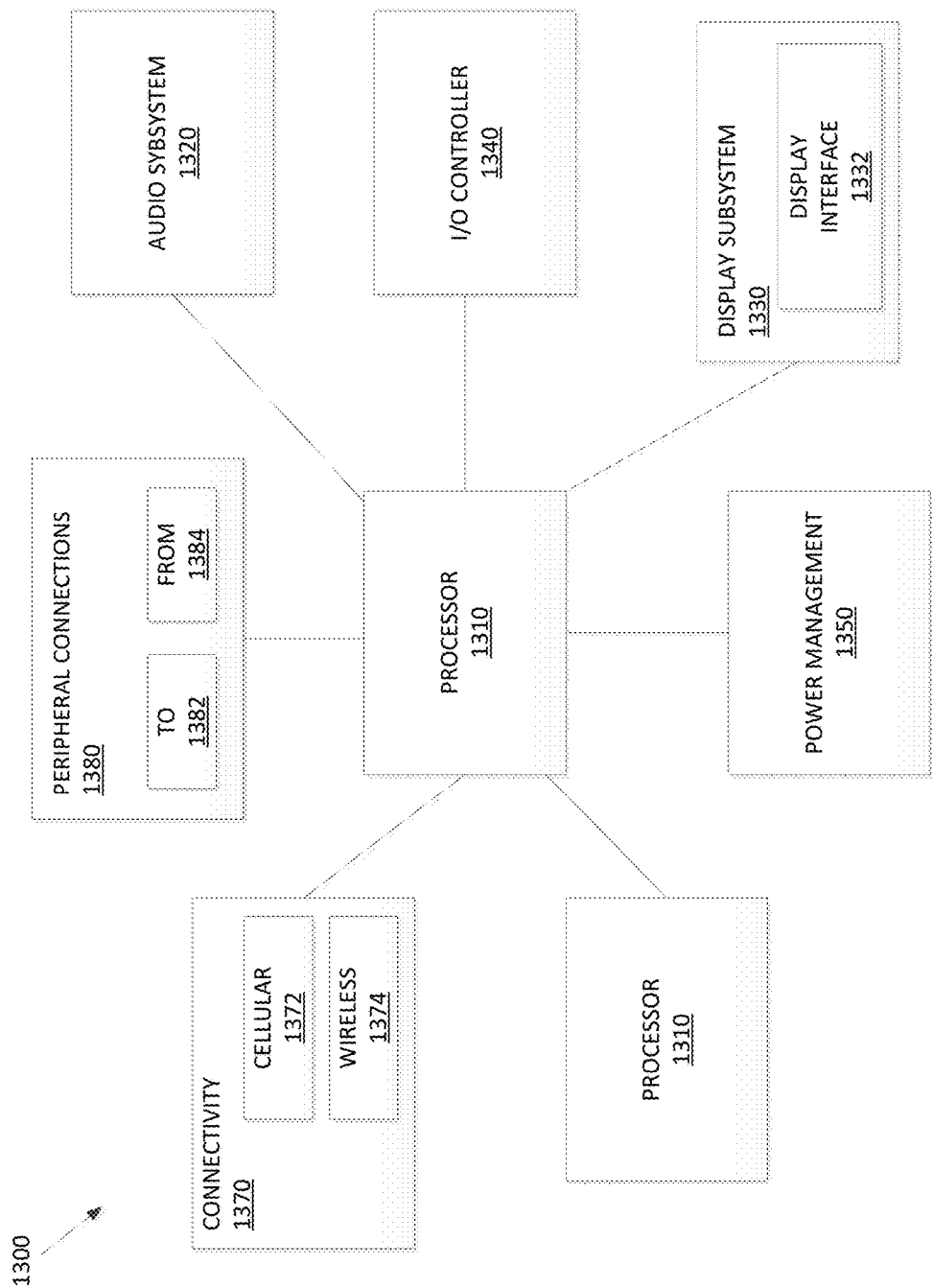
FIG. 13 illustrates a block diagram of one embodiment of a computer system.

FIG. 13 illustrates a block diagram 1300 of an embodiment of tablet computing device, a smartphone, or other mobile device in which touchscreen interface connectors may be used. Processor 1310 may monitor performance of a processing device to manage non-precise events. In addition, processor 1310 performs the primary processing operations. Audio subsystem 1320 represents hardware (e.g., audio hardware and audio circuits) and software (e.g., drivers, codecs) components associated with providing audio functions to the computing device. In one embodiment, a user interacts with the tablet computing device or smartphone by providing audio commands that are received and processed by processor 1310.

Display subsystem 1332 represents hardware (e.g., display devices) and software (e.g., drivers) components that provide a visual and/or tactile display for a user to interact with the tablet computing device or smartphone. Display subsystem 1330 includes display interface 1332, which includes the particular screen or hardware device used to provide a display to a user. In one embodiment, display subsystem 1330 includes a touchscreen device that provides both output and input to a user.

I/O controller 1340 represents hardware devices and software components related to interaction with a user. I/O controller 1340 can operate to manage hardware that is part of audio subsystem 1320 and/or display subsystem 1330. Additionally, I/O controller 1340 illustrates a connection point for additional devices that connect to the tablet computing device or smartphone through which a user might interact. In one embodiment, I/O controller 1340 manages devices such as accelerometers, cameras, light sensors or other environmental sensors, or other hardware that can be included in the tablet computing device or smartphone. The input can be part of direct user interaction, as well as providing environmental input to the tablet computing device or smartphone.

In one embodiment, the tablet computing device or smartphone includes power management 1350 that manages battery power usage, charging of the battery, and features related to power saving operation. Memory subsystem 1360 includes memory devices for storing information in the tablet computing device or smartphone. Connectivity 1370 includes hardware devices (e.g., wireless and/or wired connectors and communication hardware) and software components (e.g., drivers, protocol stacks) to the tablet computing device or smartphone to communicate with external devices. Cellular connectivity 1372 may include, for example, wireless carriers such as GSM (global system for mobile communications), CDMA (code division multiple access), TDM (time division multiplexing), or other cellular service standards). Wireless connectivity 1374 may include, for example, activity that is not cellular, such as personal area networks (e.g., Bluetooth), local area networks (e.g., WiFi), and/or wide area networks (e.g., WiMax), or other wireless communication.

Peripheral connections 1380 include hardware interfaces and connectors, as well as software components (e.g., drivers, protocol stacks) to make peripheral connections as a peripheral device ("to" 1382) to other computing devices, as well as have peripheral devices ("from" 1384) connected to the tablet computing device or smartphone, including, for example, a "docking" connector to connect with other computing devices. Peripheral connections 1380 include common or standards-based connectors, such as a Universal Serial Bus (USB) connector, DisplayPort including MiniDisplayPort (MDP), High Definition Multimedia Interface (HDMI), Firewire, etc.

Figure 14:
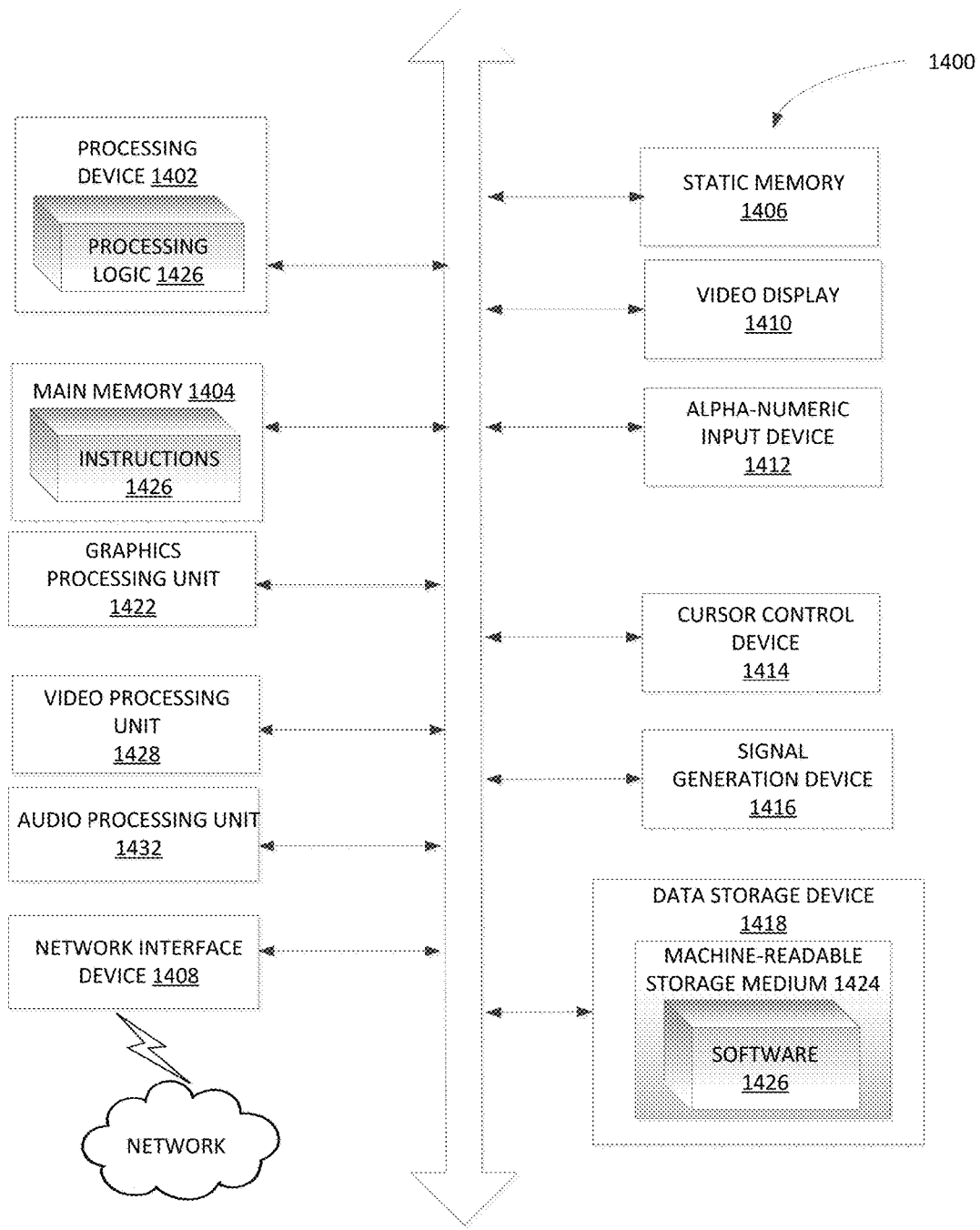
FIG. 14 illustrates a block diagram of a machine in form of a computing system in accordance with the present disclosure.

FIG. 14 illustrates a diagrammatic representation of a machine in the example form of a computing system 1400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 1400 includes a processing device 1402, a main memory 1404 (e.g., read-only memory (ROM), flash memory, dynamic random access memory (DRAM) (such as synchronous DRAM (SDRAM) or DRAM (RDRAM), etc.), a static memory 1406 (e.g., flash memory, static random access memory (SRAM), etc.), and a data storage device 1418, which communicate with each other via a bus 1430.

Processing device 1402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1402 may also be one or more special-purpose processing devices such as an application specific integrated circuit (ASIC), a field programmable gate array (FPGA), a digital signal processor (DSP), network processor, or the like. In one embodiment, processing device 1402 may include one or processing cores. The processing device 1402 is configured to execute the processing logic 1426 for performing the operations discussed herein. In one embodiment, processing device 1402 is the same as computer systems 100 and 200 as described with respect to FIG. 1 that implements the NPEBS module 106. Alternatively, the computing system 1400 can include other components as described herein.

The computing system 1400 may further include a network interface device 1408 communicably coupled to a network 1420. The computing system 1400 also may include a video display unit 1410 (e.g., a liquid crystal display (LCD) or a cathode ray tube (CRT)), an alphanumeric input device 1412 (e.g., a keyboard), a cursor control device 1414 (e.g., a mouse), a signal generation device 1416 (e.g., a speaker), or other peripheral devices. Furthermore, computing system 1400 may include a graphics processing unit 1422, a video processing unit 1428 and an audio processing unit 1432. In another embodiment, the computing system 1400 may include a chipset (not illustrated), which refers to a group of integrated circuits, or chips, that are designed to work with the processing device 1402 and controls communications between the processing device 1402 and external devices. For example, the chipset may be a set of chips on a motherboard that links the processing device 1402 to very high-speed devices, such as main memory 1404 and graphic controllers, as well as linking the processing device 1402 to lower-speed peripheral buses of peripherals, such as USB, PCI or ISA buses.

The data storage device 1418 may include a computer-readable storage medium 1424 on which is stored software 1426 embodying any one or more of the methodologies of functions described herein. The software 1426 may also reside, completely or at least partially, within the main memory 1404 as instructions 1426 and/or within the processing device 1402 as processing logic 1426 during execution thereof by the computing system 1400; the main memory 1404 and the processing device 1402 also constituting computer-readable storage media.

The computer-readable storage medium 1424 may also be used to store instructions 1426 utilizing the NPEBS module 106 described with respect to FIG. 1 and/or a software library containing methods that call the above applications. While the computer-readable storage medium 1424 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the embodiments. The term "computer-readable storage medium" shall accordingly be taken to include, but not be limited to, solid-state memories, and optical and magnetic media. While the invention has been described with respect to a limited number of embodiments, those skilled in the art will appreciate numerous modifications and variations therefrom. It is intended that the appended claims cover all such modifications and variations as fall within the true spirit and scope of this invention.

The following examples pertain to further embodiments.

Example 1 is a processing system comprising a processing core and a hardware accelerator communicatively coupled to the processing core, the hardware accelerator comprising a message scheduling module selectively operating in one of a SHA mode or an SM3 mode to generate a sequence of message words based on an incoming message and a round computation module selectively operating in one of the SHA mode or the SM3 mode to perform at least one of a message expansion or a message compression based on at least one message word of the sequence of message words.

In Example 2, the subject matter of Example 1 can optionally include a control module to select one of the SHA mode or the SM3 mode.

In Example 3, the subject matter of Examples 1-2 can optionally include wherein the message scheduling module comprise at least one multiplexer to select the operating in one of the SHA mode or the SM3 mode.

In Example 4, the subject matter of Examples 1-3 can optionally include wherein the message scheduling module comprises a plurality of message registers, wherein each of the plurality of the message registers function to operate in one of a load mode and a word-shift mode such that each one of the plurality of the message registers is coupled to other of the plurality of the message registers and at least one of the plurality of the message registers is coupled to the at least one multiplexer.

In Example 5, the subject matter of Examples 1-4 can optionally include wherein the message scheduling module comprises a plurality of logic functions coupled to at least one of the message register among the plurality of message registers to generate the sequence of message words.

In Example 6, the subject matter of Examples 1-5 can optionally include wherein the round computation module comprise at least one multiplexer to select the operating in one of the SHA mode or the SM3 mode.

In Example 7, the subject matter of Examples 1-6 can optionally include wherein the round computation module comprises a plurality of state registers, wherein each of the plurality of state registers is coupled to the at least one multiplexer and store a current state value based on one of the SHA mode or the SM3 mode.

In Example 8, the subject matter of Examples 1-7 can optionally include wherein the round computation module comprise a plurality of logic functions to process the current state in each of the state registers using the sequence of words and a constant value to generate an updated current state, wherein the constant value is a first constant value in the SM3 mode and the constant value is a second constant value in the SHA mode, wherein the first constant value is different from the second constant value.

In Example 9, the subject matter of Examples 1-8 can optionally include wherein the sequence of words comprise a single message word in the SHA mode and wherein the sequence of words comprise a pair of message words in the SM3 mode, wherein one message word in the pair of message words is the single message word and other message word in the pair of message words is different from the single message word.

Example 10 is a system-on-a chip (SoC) comprising a memory and a processor, communicatively coupled to the memory, comprising a processing core and a hardware accelerator communicatively coupled to the processing core, the hardware accelerator comprising a message scheduling module selectively operating in one of a SHA mode or an SM3 mode to generate a sequence of message words based on an incoming message and a round computation module selectively operating in one of the SHA mode or the SM3 mode to perform at least one of a message expansion or a message compression based on at least one message word of the sequence of message words.

In Example 11, the subject matter of Example 10 can optionally include a control module to select one of the SHA mode or the SM3 mode.

In Example 12, the subject matter of Examples 10-11 can optionally include wherein the message scheduling module comprise at least one multiplexer to select the operating in one of the SHA mode or the SM3 mode.

In Example 13, the subject matter of Examples 10-12 can optionally include wherein the message scheduling module comprises a plurality of message registers, wherein each of the plurality of the message registers function to operate in one of a load mode and a word-shift mode such that each one of the plurality of the message registers is coupled to other of the plurality of the message registers and at least one of the plurality of the message registers is coupled to the at least one multiplexer.

In Example 14, the subject matter of Examples 10-13 can optionally include wherein the message scheduling module comprises a plurality of logic functions coupled to at least one of the message register among the plurality of message registers to generate the sequence of message words.

In Example 15, the subject matter of Examples 10-14 can optionally include wherein the round computation module comprise at least one multiplexer to select the operating in one of the SHA mode or the SM3 mode.

In Example 16, the subject matter of Examples 10-15 can optionally include wherein the round computation module comprises a plurality of state registers, wherein each of the plurality of state registers is coupled to the at least one multiplexer and store a current state value based on one of the SHA mode or the SM3 mode.

In Example 17, the subject matter of Examples 10-16 can optionally include wherein the round computation module comprise a plurality of logic functions to process the current state in each of the state registers using the sequence of words and a constant value to generate an updated current state, wherein the constant value is a first constant value in the SM3 mode and the constant value is a second constant value in the SHA mode, wherein the first constant value is different from the second constant value.

In Example 18, the subject matter of Examples 10-17 can optionally include wherein the sequence of words comprise a single message word in the SHA mode and wherein the sequence of words comprise a pair of message words in the SM3 mode, wherein one message word in the pair of message words is the single message word and other message word in the pair of message words is different from the single message word.

Example 19 is a processing system comprising a processing core and a hardware accelerator communicatively coupled to the processing core, the hardware accelerator comprising a plurality of message registers, wherein each of the plurality of the message registers function to operate in one of a load mode and a word-shift mode such that each one of the plurality of the message registers is coupled to other of the plurality of the message registers and at least one of the plurality of the message registers is coupled to the multiplexer; a plurality of first logic functions coupled to at least one of the message register among the plurality of message registers to generate a sequence of message words; a plurality of state registers, wherein each of the plurality of state registers store a current state value; and a plurality of second logic functions to process the current state in each of the state registers using the sequence of words and a constant value to generate an updated current state.

Example 20 is a system-on-a chip (SoC) comprising a memory and a processor, communicatively coupled to the memory, comprising a processing core and a hardware accelerator communicatively coupled to the processing core, the hardware accelerator comprising a plurality of message registers, wherein each of the plurality of the message registers function to operate in one of a load mode and a word-shift mode such that each one of the plurality of the message registers is coupled to other of the plurality of the message registers and at least one of the plurality of the message registers is coupled to the multiplexer; a plurality of first logic functions coupled to at least one of the message register among the plurality of message registers to generate a sequence of message words; a plurality of state registers, wherein each of the plurality of state registers store a current state value; and a plurality of second logic functions to process the current state in each of the state registers using the sequence of words and a constant value to generate an updated current state.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a microcontroller, associated with a non-transitory medium to store code adapted to be executed by the microcontroller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The invention claimed is:

1. A processing system comprising:
  a processing core; and
  a hardware accelerator communicatively coupled to the processing core, the hardware accelerator comprising:
    a message scheduling module selectively operating in one of a secure hash algorithm (SHA) mode or an SM3 mode to generate a sequence of message words based on an incoming message;
    a round computation module selectively operating in one of the SHA mode or the SM3 mode to perform at least one of a message expansion or a message compression based on at least one message word of the sequence of message words, wherein the round computation module further comprises:
      a first shared circuit to perform at least one of a Maj function in the SHA mode or a FF function in the SM3 mode; and
      a second shared circuit to perform at least one of a Ch function in the SHA mode or a GG function in the SM3 mode.

2. The processing system of claim 1 further comprising a control module to select one of the SHA mode or the SM3 mode.

3. The processing system of claim 1 wherein the message scheduling module comprise at least one multiplexer to select the operating in one of the SHA mode or the SM3 mode.

4. The processing system of claim 3 wherein the message scheduling module comprises a plurality of message registers, wherein each of the plurality of the message registers function to operate in one of a load mode and a word-shift mode such that each one of the plurality of the message registers is coupled to other of the plurality of the message registers and at least one of the plurality of the message registers is coupled to the at least one multiplexer.

5. The processing system of claim 4, wherein the message scheduling module comprises a plurality of logic functions coupled to at least one of the message register among the plurality of message registers to generate the sequence of message words.

6. The processing system of claim 1 wherein the round computation module comprise at least one multiplexer to select the operating in one of the SHA mode or the SM3 mode.

7. The processing system of claim 6 wherein the round computation module comprises a plurality of state registers, wherein each of the plurality of state registers is coupled to the at least one multiplexer and store a current state value based on one of the SHA mode or the SM3 mode.

8. The processing system of claim 7 wherein the round computation module comprise a plurality of logic functions to process the current state in each of the state registers using the sequence of words and a constant value to generate an updated current state, wherein the constant value is a first constant value in the SM3 mode and the constant value is a second constant value in the SHA mode, wherein the first constant value is different from the second constant value.

9. The processing system of claim 1 wherein the sequence of message words comprise a single message word in the SHA mode and wherein the sequence of message words comprise a pair of message words in the SM3 mode, wherein one message word in the pair of message words is the single message word and other message word in the pair of message words is different from the single message word.

10. A system-on-a chip (SoC) comprising:
  a memory; and
  a processor, communicatively coupled to the memory, comprising:
    a processing core; and
    a hardware accelerator communicatively coupled to the processing core, the hardware accelerator comprising:
      a message scheduling module selectively operating in one of a secure hash algorithm (SHA) mode or an SM3 mode to generate a sequence of message words based on an incoming message; and
      a round computation module selectively operating in one of the SHA mode or the SM3 mode to perform at least one of a message expansion or a message compression based on at least one message word of the sequence of message words, wherein the round computation module further comprises:
        a first shared circuit to perform at least one of a Maj function in the SHA mode or a FF function in the SM3 mode; and a second shared circuit to perform at least one of a Ch function in the SHA mode or a GG function in the SM3 mode.

11. The SoC of claim 10 further comprising a control module to select one of the SHA mode or the SM3 mode.

12. The SoC of claim 10 wherein the message scheduling module comprise at least one multiplexer to select the operating in one of the SHA mode or the SM3 mode.

13. The SoC of claim 12 wherein the message scheduling module comprises a plurality of message registers, wherein each of the plurality of the message registers function to operate in one of a load mode and a word-shift mode such that each one of the plurality of the message registers is coupled to other of the plurality of the message registers and at least one of the plurality of the message registers is coupled to the at least one multiplexer.

14. The SoC of claim 13 wherein the message scheduling module comprises a plurality of logic functions coupled to at least one of the message register among the plurality of message registers to generate the sequence of message words.

15. The SoC of claim 10 wherein the round computation module comprise at least one multiplexer to select the operating in one of the SHA mode or the SM3 mode.

16. The SoC of claim 15 wherein the round computation module comprises a plurality of state registers, wherein each of the plurality of state registers is coupled to the at least one multiplexer and store a current state value based on one of the SHA mode or the SM3 mode.

17. The SoC of claim 16 wherein the round computation module comprise a plurality of logic functions to process the current state in each of the state registers using the sequence of words and a constant value to generate an updated current state, wherein the constant value is a first constant value in the SM3 mode and the constant value is a second constant value in the SHA mode, wherein the first constant value is different from the second constant value.

18. The SoC of claim 10 wherein the sequence of message words comprise a single message word in the SHA mode and wherein the sequence of message words comprise a pair of message words in the SM3 mode, wherein one message word in the pair of message words is the single message word and other message word in the pair of message words is different from the single message word.

19. A processing system comprising:
a processing core; and
a hardware accelerator communicatively coupled to the processing core, the hardware accelerator comprising:
a plurality of message registers, wherein each of the plurality of the message registers function to operate in one of a load mode or a word-shift mode such that each one of the plurality of the message registers is coupled to other of the plurality of the message registers and at least one of the plurality of the message registers is coupled to the multiplexer;
a plurality of first logic functions coupled to at least one of the message register among the plurality of message registers to generate a sequence of message words;
a plurality of state registers, wherein each of the plurality of state registers store a current state value; and
a plurality of second logic functions to process the current state in each of the state registers using the sequence of words and a constant value to generate an updated current state, wherein the plurality of second logic functions further comprise:
a first shared circuit to perform at least one of a Maj function or a FF function; and
a second shared circuit to perform at least one of a Ch function or a GG function.

20. A system-on-a chip (SoC) comprising:
a memory; and
a processor, communicatively coupled to the memory, comprising:
a processing core; and
a hardware accelerator communicatively coupled to the processing core, the hardware accelerator comprising:
a plurality of message registers, wherein each of the plurality of the message registers function to operate in one of a load mode and a word-shift mode such that each one of the plurality of the message registers is coupled to other of the plurality of the message registers and at least one of the plurality of the message registers is coupled to the multiplexer;
a plurality of first logic functions coupled to at least one of the message register among the plurality of message registers to generate a sequence of message words;
a plurality of state registers, wherein each of the plurality of state registers store a current state value; and
a plurality of second logic functions to process the current state in each of the state registers using the sequence of words and a constant value to generate an updated current state, wherein the plurality of second logic functions further comprise:
a first shared circuit to perform at least one of a Maj function or a FF function; and
a second shared circuit to perform at least one of a Ch function or a GG function.

* * * * *